US012179451B2

(12) United States Patent
Jovanovic

(10) Patent No.: US 12,179,451 B2
(45) Date of Patent: Dec. 31, 2024

(54) MAILER FORMING APPARATUS AND METHOD OF FORMING

(71) Applicant: Intertape Polymer Corp., Sarasota, FL (US)

(72) Inventor: Bojan Jovanovic, Glen Ellyn, IL (US)

(73) Assignee: INTERTAPE POLYMER CORP., Sarasota, FL (US)

( * ) Notice: Subject to any disclaimer, the term of this patent is extended or adjusted under 35 U.S.C. 154(b) by 315 days.

(21) Appl. No.: 17/733,425

(22) Filed: Apr. 29, 2022

(65) Prior Publication Data

US 2022/0347958 A1 Nov. 3, 2022

Related U.S. Application Data

(60) Provisional application No. 63/181,644, filed on Apr. 29, 2021.

(51) Int. Cl.
*B31B 50/00* (2017.01)
*B31B 50/04* (2017.01)
(Continued)

(52) U.S. Cl.
CPC .......... *B31B 50/006* (2017.08); *B31B 50/042* (2017.08); *B31B 50/36* (2017.08);
(Continued)

(58) Field of Classification Search
CPC ..... B31B 50/36; B31B 50/624; B31B 50/626; B31B 50/006; B31B 50/042
See application file for complete search history.

(56) References Cited

U.S. PATENT DOCUMENTS 2,857,827 A * 10/1958 Labombarde ........... B31B 50/00
493/419
3,377,927 A 4/1968 Propper
(Continued)

FOREIGN PATENT DOCUMENTS

JP 61160234 A 7/1986

OTHER PUBLICATIONS

International Bureau of WIPO; International Preliminary Report on Patentability for International Application No. PCT/US22/27042 dated Nov. 9, 2023, 13 Pages.
(Continued)

*Primary Examiner* — Andrew M Tecco
*Assistant Examiner* — Nicholas E Igbokwe
(74) *Attorney, Agent, or Firm* — Jeffrey R. Gray; Moore & Van Allen PLLC

(57) ABSTRACT

An improved mailer folding apparatus that forms mailers from mailer blanks. The mailer folding apparatus comprises a transport assembly and one or more folding assemblies. The transport assembly moves mailer blanks and/or mailers through the mailer folding apparatus. The one or more folding assemblies may each comprise a folding system and a carriage system. The folding system may selectively allow for the folding of a mailer blank into a mailer. A carriage of the carriage system may move the folding system longitudinally between different positions relative to the transport assembly. An engagement system separate from the carriage system or integrated into the carriage system may engage and disengage the folding system with the transport system for selectively feeding a mailer blank through the folding system, or disengage the folding system for allowing a mailer blank or folded mailer to bypass the folding system.

18 Claims, 18 Drawing Sheets

(51) Int. Cl.

| | |
|---|---|
| ***B31B 50/36*** | (2017.01) |
| ***B31B 50/62*** | (2017.01) |
| *B31B 100/00* | (2017.01) |

(52) U.S. Cl.

CPC .......... *B31B 50/624* (2017.08); *B31B 50/626* (2017.08); *B31B 2100/00* (2017.08)

(56) References Cited

U.S. PATENT DOCUMENTS

| | | | | | |
|---|---|---|---|---|---|
| 3,495,818 | A * | 2/1970 | Marin | B65H 45/144 | 493/420 |
| 4,071,997 | A * | 2/1978 | Gunther, Jr. | B43M 5/047 | 53/461 |
| 4,105,197 | A * | 8/1978 | Pott | B65H 45/12 | 493/416 |
| 4,299,073 | A * | 11/1981 | Golicz | B65B 25/14 | 53/493 |
| 4,784,379 | A * | 11/1988 | Vander Syde | B43M 3/02 | 53/284.3 |
| 4,951,864 | A * | 8/1990 | Dicker | B42D 15/08 | 229/80 |
| RE34,338 | E * | 8/1993 | Beck | B65H 45/144 | 53/562 |
| 2005/0051613 | A1* | 3/2005 | Settle | B42D 15/08 | 229/304 |

OTHER PUBLICATIONS

European Patent Office; International Search Report & Written Opinion for International Application No. PCT/US2022/027042 dated Dec. 2, 2022, 21 Pages.

European Patent Office; Invitation to Pay Additional Fees & Partial Search Report for International Application No. PCT/US2022/027042 dated Oct. 11, 2022, 19 Pages.

* cited by examiner

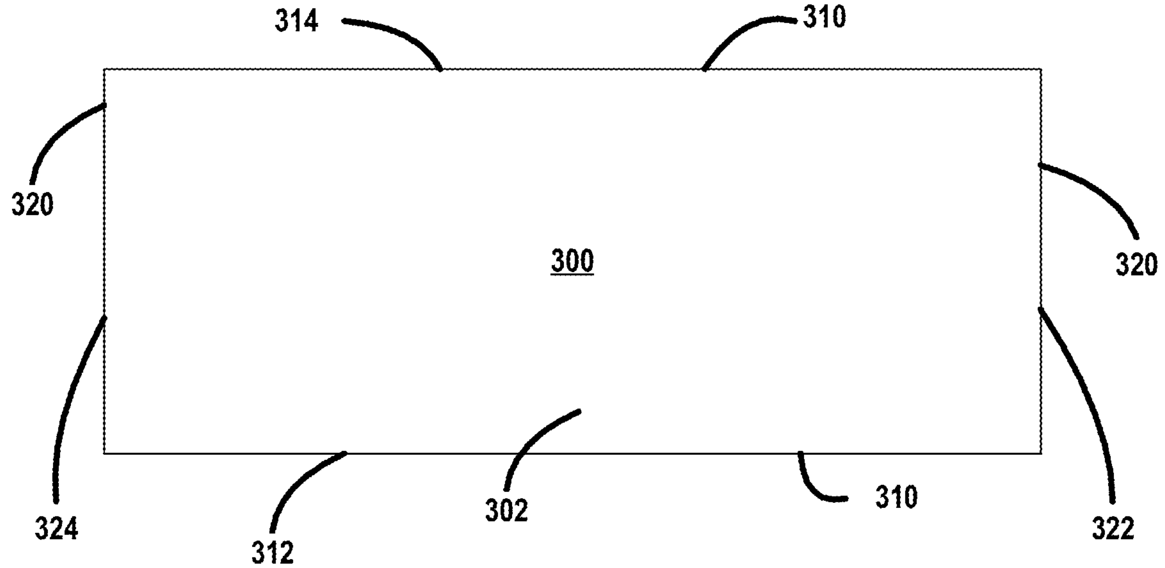
*FIG.* 5A
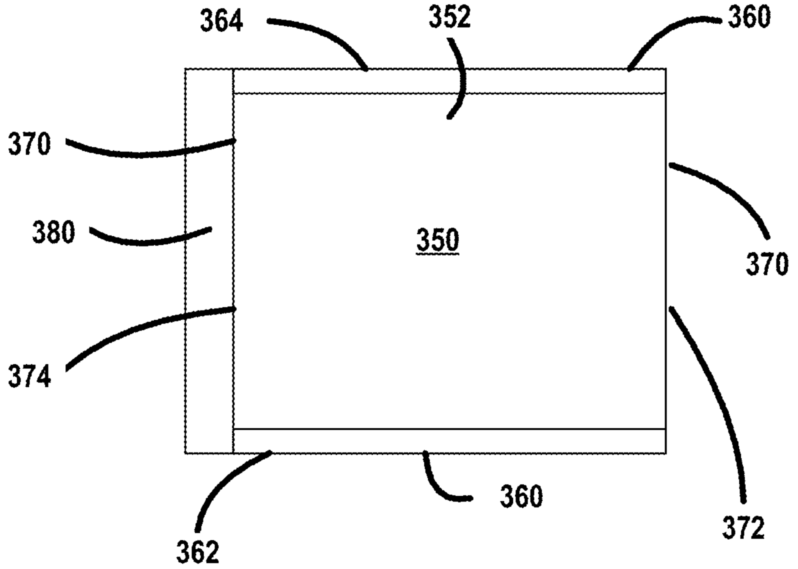
*FIG.* 5B

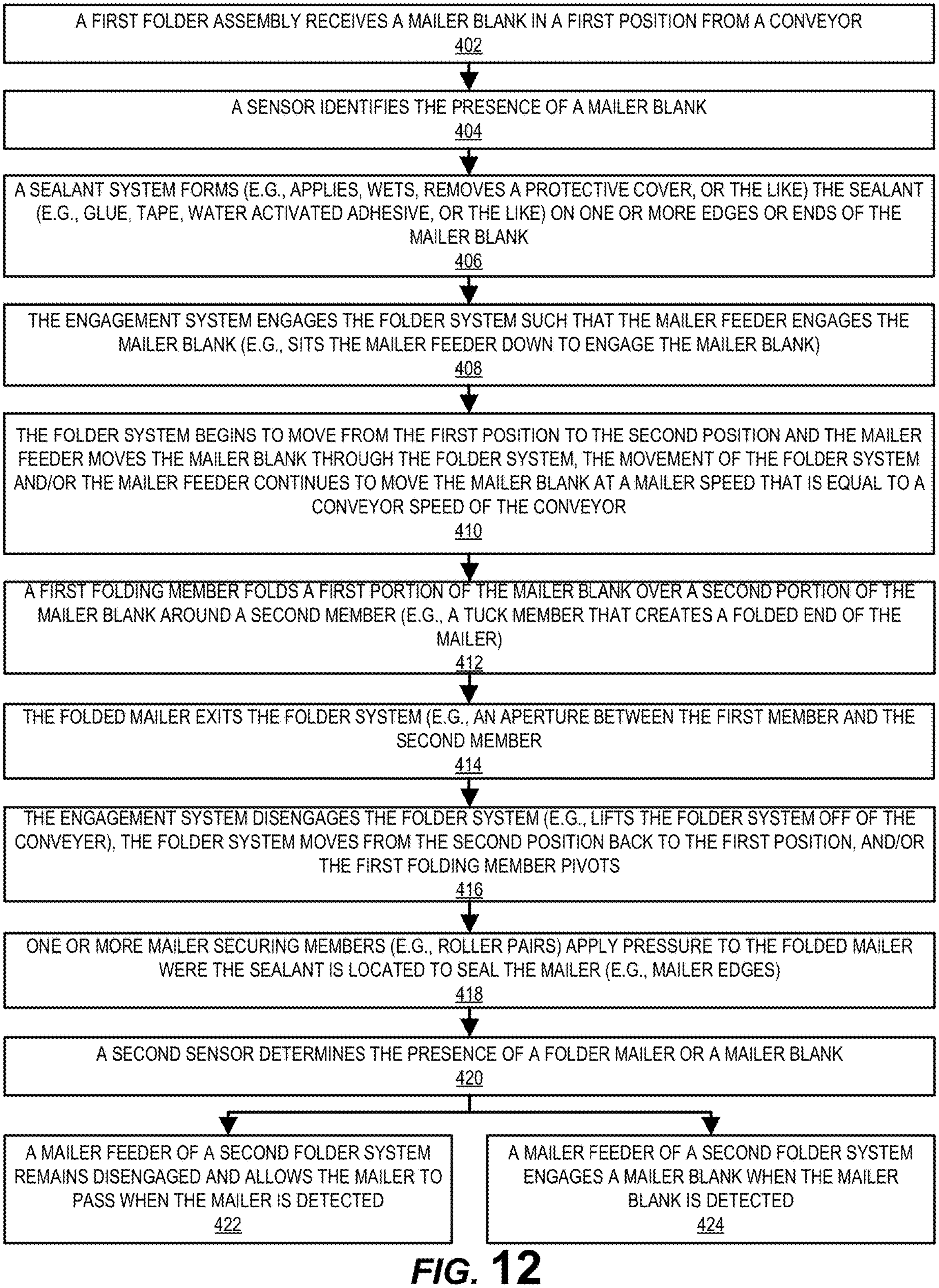
*FIG.* 12

*FIG.* 13
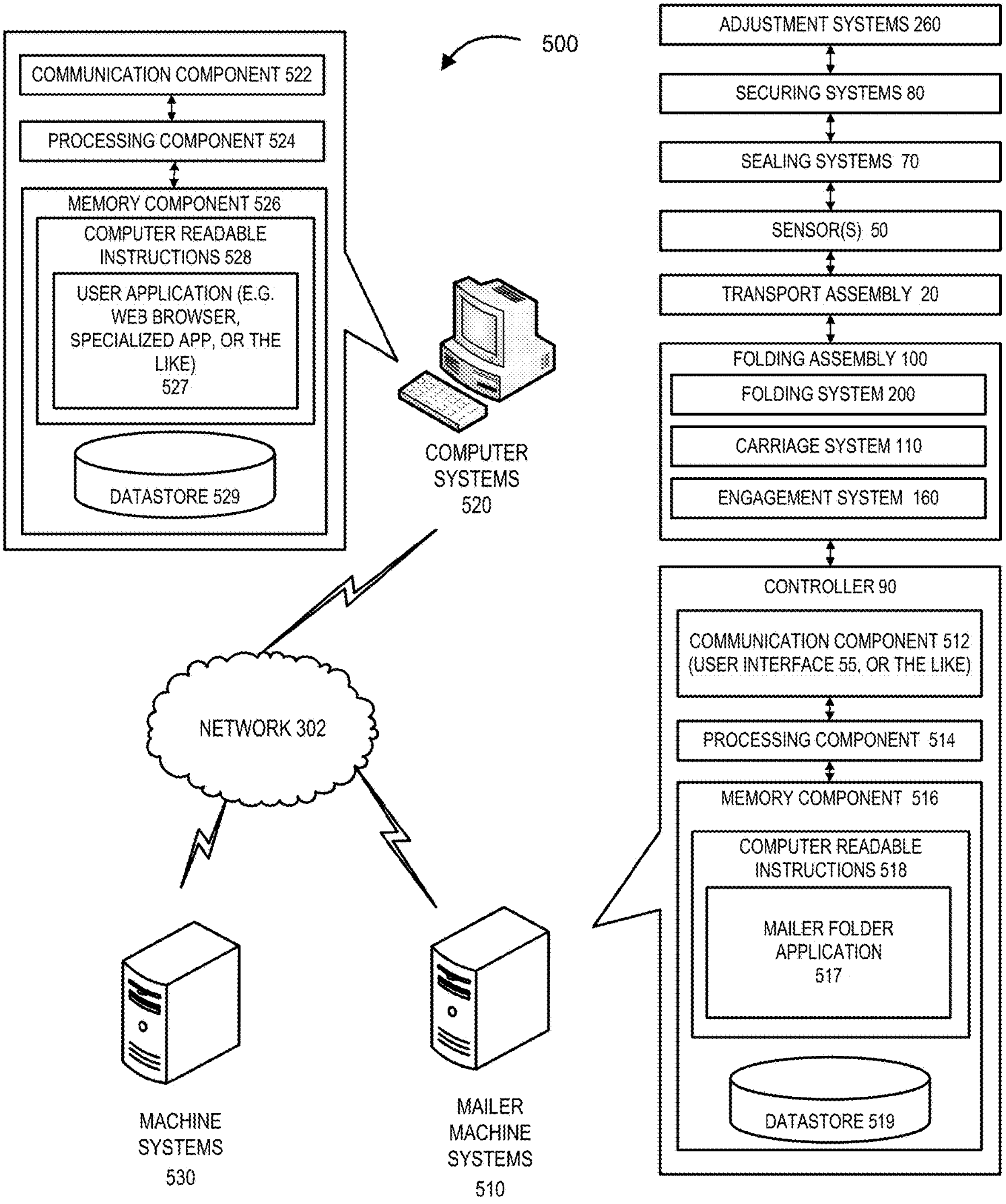

MAILER FORMING APPARATUS AND METHOD OF FORMING

CROSS REFERENCE AND PRIORITY CLAIM UNDER 35 U. S. C. § 119

This application claims priority to U.S. Provisional Application No. 63/181,644 entitled "A Mailer Forming Apparatus and Method of Forming" filed on Apr. 29, 2021, which is assigned to the assignee hereof and the entirety of which is incorporated by reference herein.

FIELD

The present disclosure relates generally to a mailer machine. More specifically, a mailer machine that provides improvements in forming a mailer, in particular in folding and securing a mailer or multiple mailers at the same time.

BACKGROUND

A mailer machine automatically cuts, folds, and/or secures a mailer blank to form a mailer. Conventional mailer machines cannot form a mailer efficiently and/or the desired number of mailers efficiently.

BRIEF SUMMARY

Embodiments of the invention comprise an improved mailer folding apparatus (otherwise described herein as mailer folding machine, mailer folder machine, mailer forming machine, or the like), which may be a stand-alone mailer folding apparatus or may be a part of a larger mailer machine. The mailer folding apparatus allows for the formation of mailers from mailer blanks or a strip of one or more layers of material. The mailer folding apparatus comprises a transport assembly and one or more folding assemblies (e.g., a first folding assembly and a second folding assembly located in-line with respect to the transport assembly). The transport assembly may include a conveyor system that moves mailer blanks and/or mailers along a conveyor. The one or more folding assemblies may each comprise a folding system and a carriage system. The folding system may selectively allow for the folding of a mailer blank (supplied to the folding system or cut by, or upstream of, the folding system into a mailer (e.g., each inline folding system may fold every other mailer blank on the transport assembly into a mailer). A carriage of the carriage system may move the folding system longitudinally between different positions relative to the transport assembly. An engagement system, separate from the carriage system or integrated into the carriage system, may engage (e.g., drop, or the like) and disengage (e.g., lift, or the like) the folding system (e.g., the entire folding system or a portion thereof, such as a component thereof, such as mailer feeder, or the like) with the transport system. As such, the engagement system may engage the folding system for feeding a mailer blank through the folding system or disengage the folding system for allowing a mailer blank or folded mailer to bypass the folding system. It should be understood that a "mailer blank" may be made of any type of material, be of any shape, have one or more layers, or the like, and be used to create a mailer. It should be understood that a "mailer" is a package that has outer surfaces, edges, and/or ends (e.g., two edges, a closed end, and at least one open end, or the like). It should be understood that the mailer may have any shape, size, and closing feature, and as such may be an A-style, square, rectangular, commercial, booklet, catalog, or any other type of mailer.

One embodiment of the invention is a mailer apparatus a comprising a transport assembly that moves a mailer blank and a folding assembly operatively coupled to the transport assembly. The folding assembly comprises a carriage system and a folding system operatively coupled to the carriage system. The folding assembly receives the mailer blank in a first position, the carriage system moves the folding system with respect to the transport assembly to a second position, the folding system folds the mailer blank into a mailer, and the carriage system returns the folding system to the first position.

In further accord with embodiments the folding system further comprises a mailer feeder that moves the mailer blank through the folding system.

In other embodiments, the mailer feeder moves the mailer blank through the folding system at a feeding speed that is the same as a transport speed of the transport assembly. The carriage system moves the folding system at a carriage speed that is the same as the transport speed and the mailer blank is folded at a folding speed that is less than the transport speed or static.

In still other embodiments, the mailer feeder comprises one or more feeder rollers, one or more feeder belts operatively coupled to the one or more feeder rollers, and one or more feeder drives.

In yet other embodiments, the folding assembly further comprises an engagement system. The engagement system engages the mailer feeder for receiving the mailer blank and disengages the mailer feeder for allowing the mailer blank to bypass the folding system.

In other embodiments, the folding system further comprises a first folding member and a second folding member. The first folding member receives the mailer blank in a first folding position, actuates between the first folding position to a second folding position to fold the mailer blank around the second folding member.

In further accord with embodiments, the second folding member comprises a tuck portion with a tuck edge.

In other embodiments, the mailer apparatus further comprises one or more sealing systems that activate a sealant on one or more blank edges of the mailer blank.

In still other embodiments, the sealant is glue and the one or more sealing systems are one or more glue dispensers that dispense the glue on the one or more blank edges of the mailer blank.

In yet other embodiments, the mailer apparatus further comprises one or more securing systems that apply pressure to one or more mailer edges of the mailer.

In other embodiments, the one or more securing systems comprise a pair of rollers that apply pressure to the one or mailer edges of the mailer.

In further accord with embodiments, the mailer apparatus further comprises one or more sensors that identify a presence of the mailer blank to activate the folding assembly.

In other embodiments, the transport assembly comprises a conveyor that moves the mailer blank or the mailer.

In still other embodiments, the conveyor comprises a roller conveyor, a belt conveyor, or a slide conveyor.

In yet other embodiments, the folding assembly comprises a first folding assembly comprising a first folding system and a first carriage system. The mailer apparatus further comprises a second folding assembly comprising a second carriage system and a second folding system operatively coupled to the second carriage system. The first folding system receives first mailer blanks and folds the first mailer blanks into first mailers and allows second mailer blanks to bypass the first folding system. The second folding system receives the second mailer blanks and folds the second mailer blanks into second mailers, and allows the first mailers to bypass the second folding system.

In other embodiments, the mailer apparatus further comprises an adjustment system that adjusts the folding assembly for mailer blanks or mailers of different widths.

Another embodiment of the invention comprises a mailer apparatus comprising a transport assembly that moves mailer blanks or mailers, a first folding assembly operatively coupled to the transport assembly and comprising a first folding system, and a second folding assembly operatively coupled to the transport assembly and comprising a second folding system. The first folding system receives first mailer blanks and folds the first mailer blanks into first mailers and allows second mailer blanks to bypass the first folding system, and the second folding system receives the second mailer blanks and folds the second mailer blanks into second mailers and allows the first mailers to bypass the second folding system.

Another embodiment of the invention comprises a method of forming mailers using a mailer machine. The method comprise receiving mailer blanks and folding the mailer blanks into the mailers.

In further accord with embodiments, the mailers are formed by moving the mailer blanks using a transport assembly, and receiving the mailers blanks at a folding assembly operatively coupled to the transport assembly. The folding assembly comprises a carriage system and a folding system operatively coupled to the carriage system. The folding assembly receives a mailer blank in a first position, the carriage system moves the folding system with respect to the transport assembly to a second position, the folding system folds the mailer blank into a mailer, and the carriage system returns the folding system to the first position.

In other embodiments, the mailers are formed by moving the mailer blanks using a transport assembly operatively coupled to a first folding system and a second folding system. The method further comprises receiving first mailer blanks at the first folding system that folds the first mailer blanks into first mailers and allows second mailer blanks to bypass the first folding system. The method further comprises receiving the second mailer blanks at the second folding system that folds the second mailer blanks into second mailers and allows the first mailers to bypass the second folding system.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The following figures (sometimes abbreviated as “FIG.” or “FIGS.” herein) will now be described by way of example, not by way of limitation, in which:

FIG. 5A is a top view of a mailer blank, in accordance with embodiments of the present disclosure.

FIG. 5B is a top view of a mailer formed from the mailer blank, in accordance with embodiments of the present disclosure.

FIG. 12 provides a process flow for using the mailer folding apparatus for forming mailers, in accordance with embodiments of the present disclosure.

FIG. 13 provides a schematic diagram for a mailer machine network for operating the mailer folding machine and/or communicating with other systems, in accordance with embodiments of the present disclosure.

Figure 1:
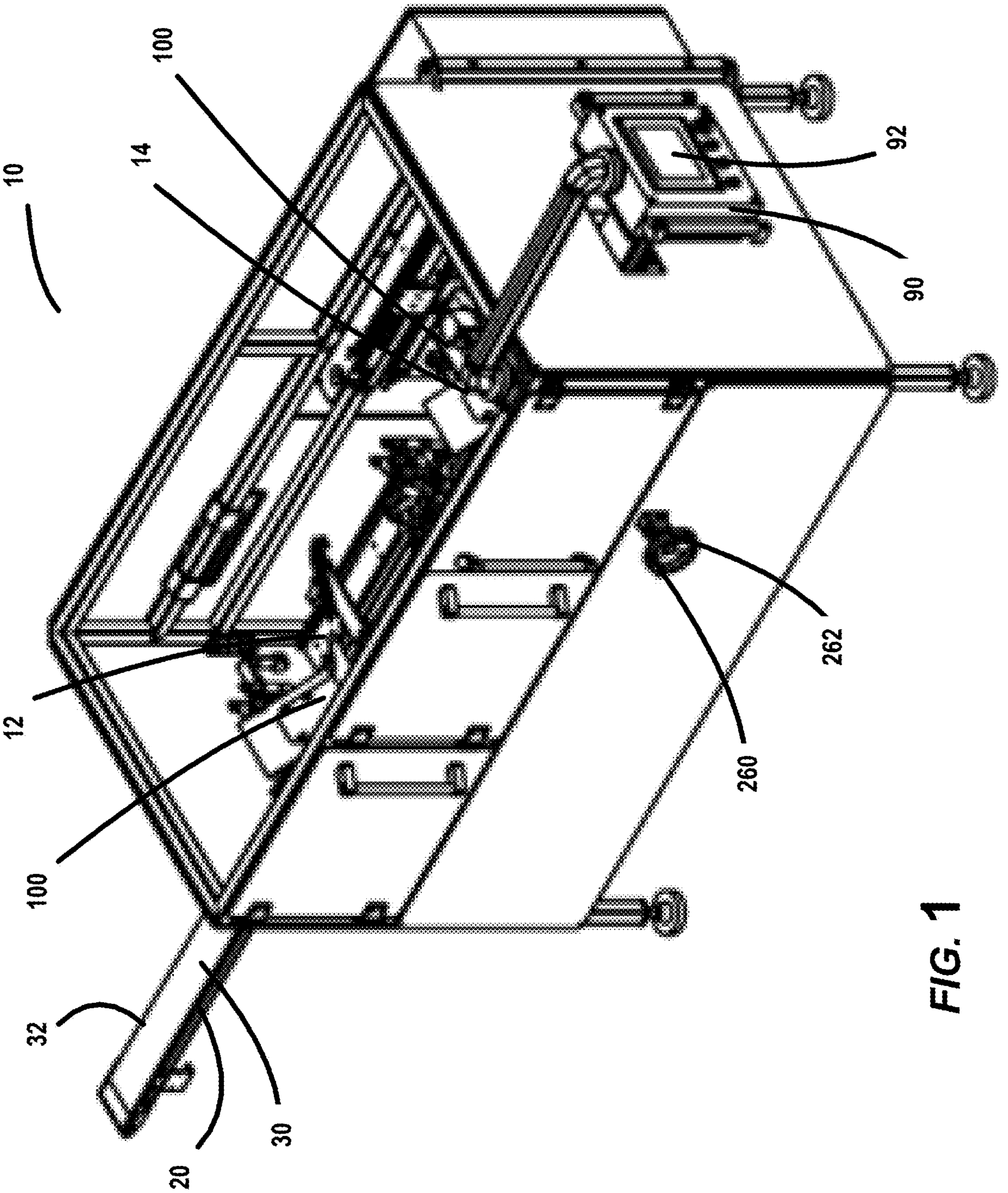
FIG. 1 is a perspective view of a mailer folding apparatus, in accordance with embodiments of the present disclosure.
Figure 2:
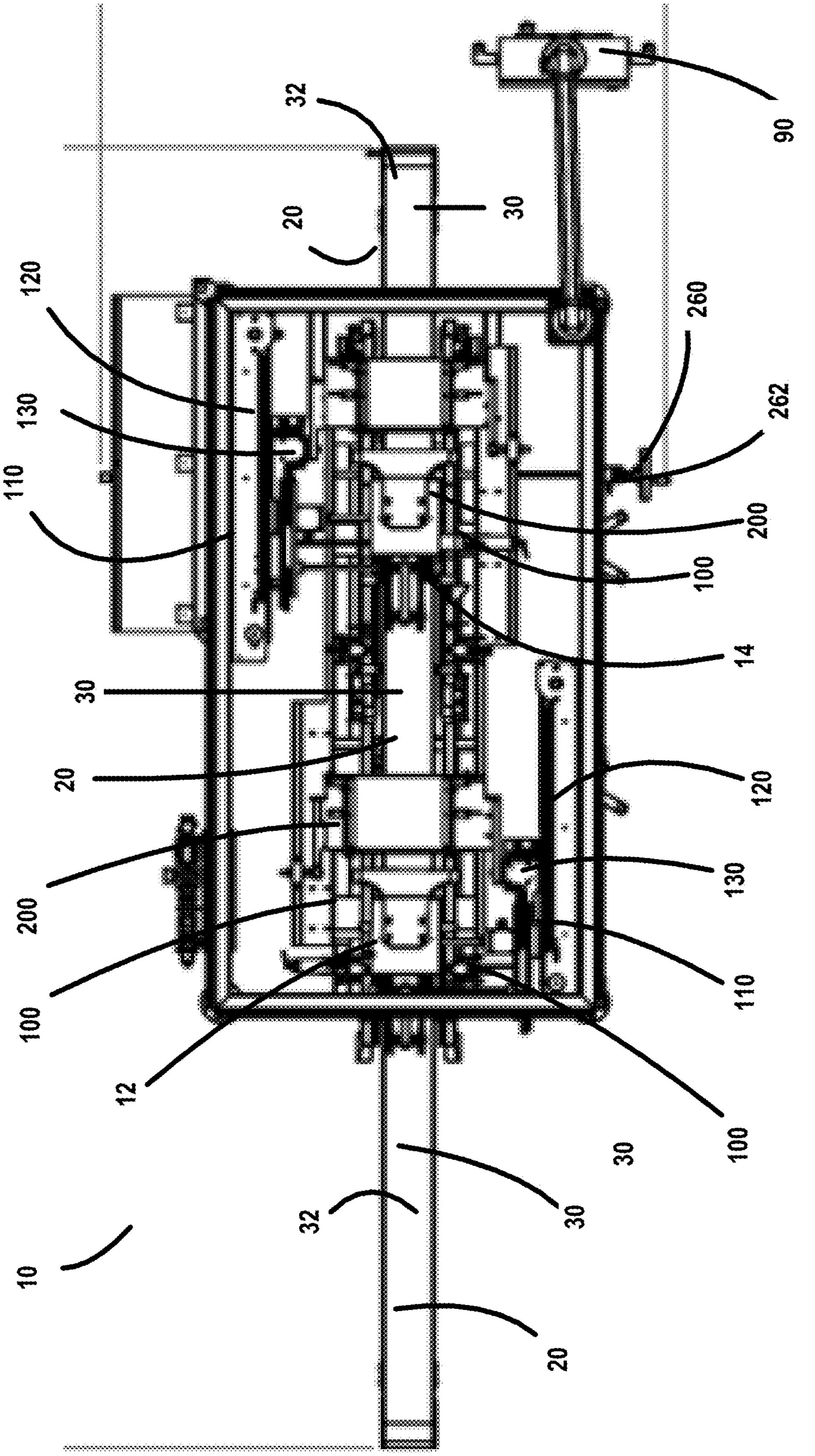
FIG. 2 is a top view of a mailer folding apparatus with multiple folding assemblies, in accordance with embodiments of the present disclosure.
Figure 3:
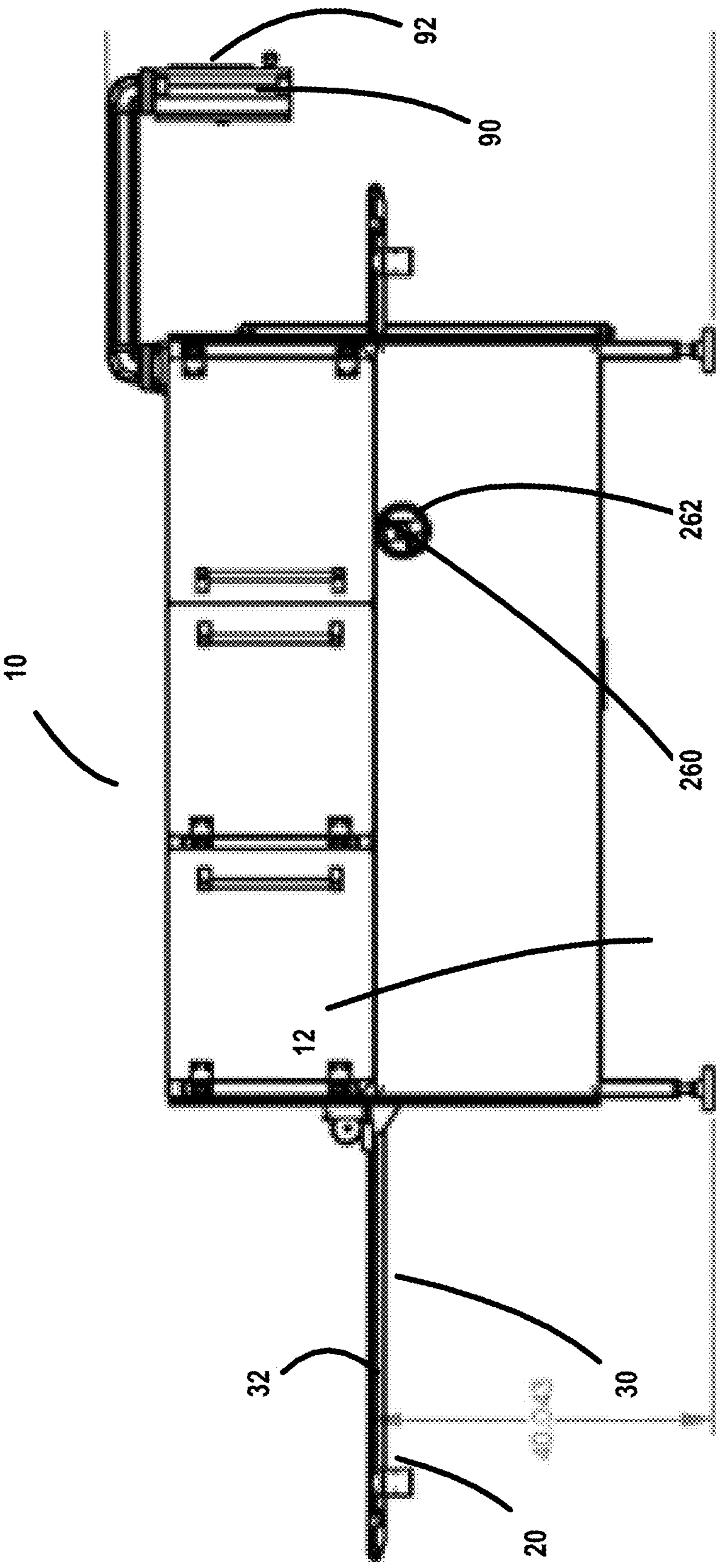
FIG. 3 is a side view of a mailer folding apparatus with covers, in accordance with embodiments of the present disclosure.
Figure 4:
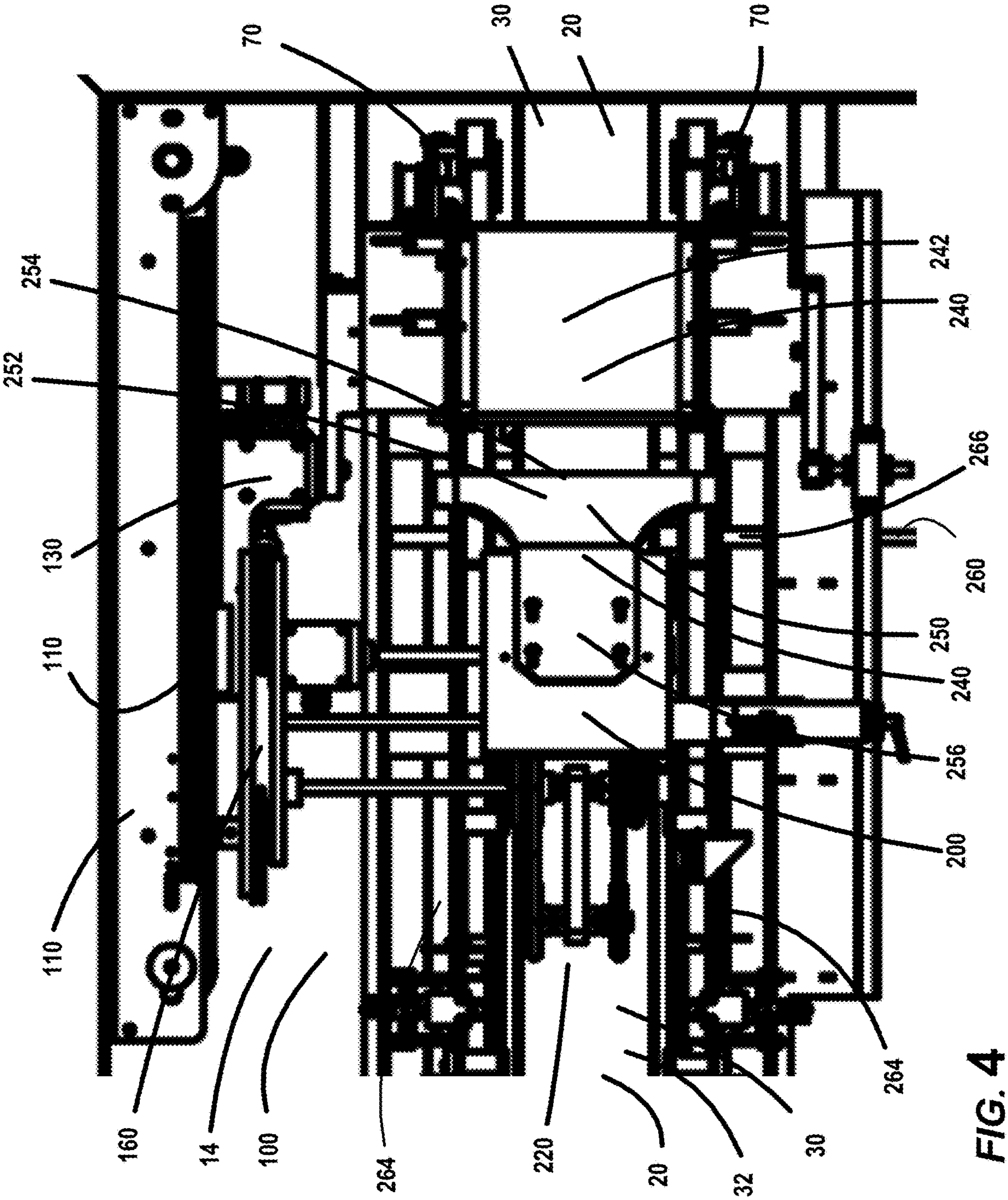
FIG. 4 is a top view of folding assembly of a mailer folding apparatus, in accordance with embodiments of the present disclosure.
Figure 6:
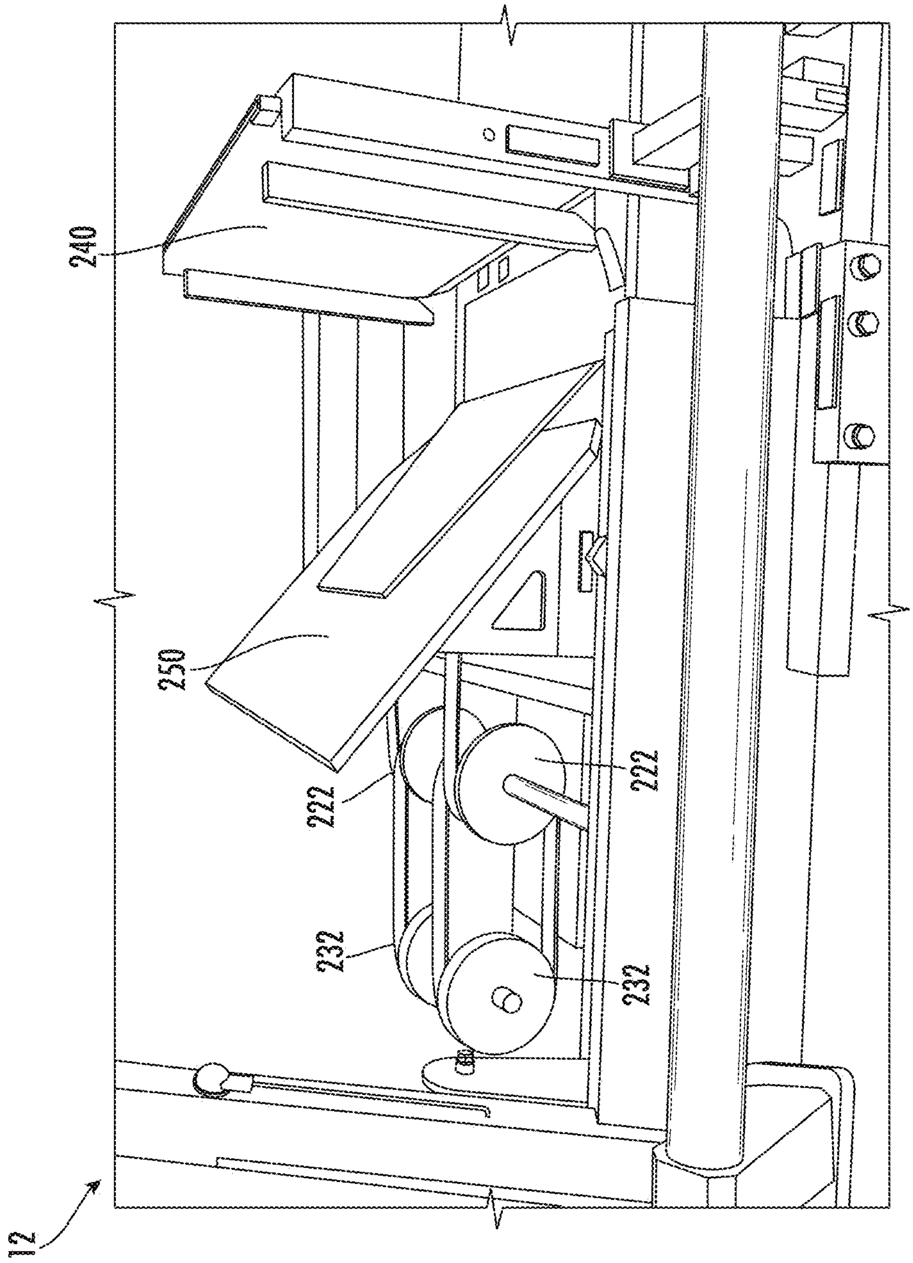
FIG. 6 is a side perspective view of a folding assembly of a mailer folding apparatus, such as a first folding assembly, in accordance with embodiments of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible to embodiments in many different forms, there is shown in the drawings and will herein be described in detail embodiments of the present disclosure with the understanding that the present disclosure is to be considered as an exemplification of the principles of the present disclosure and is not intended to limit the broad aspect of the present disclosure to the embodiments illustrated.

FIGS. 1-4 and 6-11B illustrate embodiments of the invention for an improved mailer folding apparatus 10 (otherwise described herein as mailer folding machine, mailer folder apparatus, mailer forming apparatus, or the like), which may be a stand-alone mailer folding apparatus 10 or may be a part of a larger mailer machine. The mailer folding apparatus 10 allows for the formation of mailers 350 from mailer blanks 300. The mailer folding apparatus 10 comprises a transport assembly 20 and one or more folding assemblies 100 (e.g., a first folding assembly 102 and a second folding assembly 104 located in-line with respect to the transport assembly 20). The transport assembly 20 may include a conveyor 30 (otherwise described as a conveyor system) that moves mailer blanks 300 and/or mailers 350 along the conveyor 30. The one or more folding assemblies 100 may each comprise a folding system 200 and a carriage system 110. The folding system 200 may selectively allow for the folding of a mailer blank 300 into a mailer 350 (e.g., each in-line folding system 200 may fold every other mailer blank 300 on the transport assembly 20 into a mailer 350). A carriage 130 of the carriage system 110 may move the folding system 200 longitudinally between different positions relative to the transport assembly 20. An engagement system 160 separate from the carriage system 110 or integrated into the carriage system 110 may engage (e.g., drop, or the like) and disengage (e.g., lift, or the like) the folding system 200 (e.g., the entire folding system 200 or a portion thereof, such as a component thereof, such as mailer feeder 220, or the like) with the transport system 20. As such, the engagement system 160 may engage the folding system 200 for feeding a mailer blank 300 through the folding system 200 or disengage the folding system for allowing a mailer blank 350 or mailer 300 to bypass the folding system 200.

It should be understood that a "mailer blank" 300 may be made of any type of material, be of any shape, have one or more layers, or the like, and be used to create a mailer 350. As illustrated in FIG. 5A, the mailer blank 300 may have an inner blank surface 302, an outer blank surface 304, blank edges 310 (e.g., first blank edge 312, second blank edge 314, or the like), and/or blank ends 320 (e.g., first blank end 322, second blank end 324, or the like). As illustrated in FIG. 5B, it should be understood that a "mailer" 350 is a package, envelope, pouch, or the like that has a first outer surface 352, a second outer surface 354, mailer edges 360 (e.g., first mailer edge 362, second mailer edge 364, or the like), and/or mailer ends 370 (e.g., first mailer end 372, second mailer end 374), or the like of the mailer 350. In some embodiments, the mailer 350 may have a mailer lip 380. It should be understood that the mailer may have any shape and size, and as such may be an A-style, square, rectangular, commercial, booklet, catalog, or the like type of mailer. It should also be understood that the mailer blanks 300, and thus, the mailer 350, may have one or more layers of materials. For example, the mailer blank 300 may include layers of paper, plastic, cushioning material, and/or other materials. In some embodiments, the mailer blank 300 may include a layer of paper (e.g., kraft paper, or the like) with a cushioning material (e.g., expandable slit-sheet paper, or the like). However, it should be understood that the mailer 350 may be made of any material and/or have any number of layers.

As illustrated in FIGS. 1-4 and 7A-11B, the transport assembly 20 may include a conveyor 30 (e.g., a conveyor belt 32, conveyor rollers—rollers without a belt, a slide, or other like conveyor that moves a mailer blank 300 and/or mailer 350 from one location to another). A mailer blank 300 is received adjacent a first end 22 of the transport assembly 20 and is moved from the first end 22 of the transport assembly 20 to adjacent the second end 24 of the transport assembly 20. The mailer blank 300 may be received manually from a user, automatically, or may be formed upstream of the transport assembly 20 after dies cut the mailer blank 300 to the desired size. It should be understood that the transport assembly 20 may be any type of assembly that moves the mailer blank 300 from a location adjacent the first end 22 to the one or more folding assemblies 100, and the mailer 350 to another location adjacent the second end 24 after the mailer blank 300 has been folded into the mailer 350. In the illustrated embodiment, the transport assembly 20 comprises a conveyor belt 32 and a belt drive system 34 (e.g., one or more gears, rollers, chains, motors, shafts, or the like) that move the conveyor belt 32. However, in other embodiments the drive system 34 may move conveyor rollers or other mechanisms that can move the mailer blanks 300 and/or mailers 350. It should be understood that the transport assembly 20 may be any type of transport that can move a mailer blank 300 and/or mailer 350 through the mailer folding machine 10.

As will be described in further detail herein, the mailer folding apparatus 10 may comprise two folding assemblies 100 (otherwise described as folder assemblies 100), such as a first folding assembly 12 (otherwise described as a first folder assembly 12) and a second folding assembly 14 (otherwise described as a second folder assembly 14). As illustrated in FIGS. 1-4, and 6-11B, each folding assembly 100 comprises a carriage system 110 and a folding system 200. The carriage system 110 may comprise a carriage track 120 (e.g., rail, slide, rack, or the like), a carriage 130, and a carriage drive 140 (e.g., gears, belts, chains, carriage actuator—motor, solenoid, pneumatic, hydraulic, or other actuator, or the like). The carriage 130 is operatively coupled to the folding system 200 and moves with respect to the carriage track 120 in order to move the folding system between 200 a first position 202 (e.g., a mailer blank receiving position, or the like) to a second position 204 (e.g., a mailer discharging position, or the like). As will be described in further detail herein, the movement of the folding system 200 aids in folding one or more mailer blanks 300 into one or more mailers 350 at high speeds. While it is described that each folding system 200 has its own carriage system 110 it should be understood that a single carriage system 110 may operate to move multiple folding systems 200.

An engagement system 160, as illustrated in FIGS. 1-4, may be utilized to engage (e.g., drop, or the like) or disengage (e.g., lift, or the like) the folding system 200, such as in order to accept a mailer blank 300 to create a mailer 350 when the folding system 200 is engaged, or to allow a mailer blank 300 and/or a mailer 350 to bypass (e.g., pass under, or the like) the folding system 200. The engagement system 160 may be operatively coupled to the carriage system 130 and/or the folding system 200 (e.g., between the carriage 130 of the carriage system 110 and the folding system 200). In other embodiments, the engagement system 160 may be operatively coupled to a specific component of the folding system 200 (e.g., the mailer feeder 220, or the like) that allows for the engagement or disengagement of the component of the folding system 200. As such, the engagement system 160 may engage and disengage the entire folding assembly 100, the entire folding system 200, and/or a component of the folding system 200. Regardless of the configuration, the engagement system 160 may comprise an engagement drive 162 (e.g., gears, belts, chains, tracks, shafts, carriage actuator—motor, solenoid, pneumatic, hydraulic, or other actuator, or the like) and an engagement member 164 (e.g., support member that is operatively coupled to carriage 130, folding system 200, and/or engagement drive 162). The engagement drive 162 may be utilized to move the engagement member 164 to disengage and engage the folding system 200 from the transport assembly 20. That is, the engagement drive 162 may lift the folding system 200 such that at least a portion of the folding system 200 is off of the transport assembly 20, such as the conveyor 30. Consequently, each folding system 200 may be movable between the first position 202 and the second position 204 with respect to the transport system 20 (e.g., conveyor 30, or the like) using the carriage system 110 (e.g., carriage 130 that moves respect to the track 120, or the like) and/or be moved between an engaged position and disengaged position with respect to the transport system 20 (e.g., conveyor 30, or the like), in combination with each other or independently of each other.

The folding system 200 may comprise a mailer feeder 220, as illustrated in FIGS. 6-11B, which moves the mailer blank 300 through the folding system 200 and one or more folding members 240 that fold a mailer blank 300 into a mailer 350. As illustrated in FIGS. 4 and 6-9A, one or more sealing systems 70 (e.g., sealing dispensers, or the like) may form (e.g., dispense, or the like) a sealant (e.g., glue, or the like) on the mailer blanks 300 before the mailer blanks 300 are folded by the folding system 200. As illustrated in FIGS. 8B, 9B, 10B, and 11B, one or more mailer securing systems 80 may be used to secure the mailer blanks 350 where the sealant is located in order to form a mailer 350 from the mailer blank 300. The one or more sealing systems 70 and/or the one or more mailer securing systems 80 may be operatively coupled to the folding assemblies 100 (e.g., be a part of the folding system 200, carriage system 110, or the like), may be operatively coupled to the transport assembly 20, or the like.

In some embodiments, as illustrated in FIGS. 6-11B, the mailer feeder 220 may comprise one or more feeder rolls 222, such as an entry feeder roll 226 and an exit feeder roll 228, operatively coupled to one or more feeder drives 210 (e.g., gears, belts, chains, tracks, shafts, carriage actuator—motor, solenoid, pneumatic, hydraulic, or other actuator, or the like). The one or more feeder drives 210 when activated may rotate the one or more feeder rolls. The entry feeder roll 226 may be operatively coupled to an exit feeder roll 228 through the use of a belt 229. In the illustrated embodiment in FIG. 2, the mailer feeder 220 may comprise first feeder rolls 224 comprising a first entry feeder roll 226 operatively coupled to a first exit feeder roll 228 by a first feeder belt 229, and second feeder rolls 234 comprising of a second entry feeder roll 236 operatively coupled to a second exit feeder roll 238 by a second feeder belt 239. As further illustrated in FIGS. 6-11B, the first entry feeder roll 226 may be operatively coupled to the second entry feeder roll 236 through an entry shaft 225, while the first exit feeder roll 228 may be operatively coupled to the second exit feeder roller 238 by an exit shaft 335. As further illustrated in FIGS. 6-11B, the mailer feeder 220 may further comprise one or more guide rollers 232 (e.g., two guide rollers) operatively coupled to the first feeder rolls 224 and/or the second feeder rolls 234. In the illustrated embodiments, the one or more guide rollers 232 receive the mailer blank 300 and guide the mailer bank 300 to the entry feeder rolls 226, 236, which along with the exit feeder rolls 228, 238 moves the mailer blank 300 through the folding system 200, such as to the one or more folding members 240 of the folding system 200.

In the embodiment illustrated in FIGS. 6-11B, a first folding member 242 may receive a first end 322 of the mailer blank 300. The first folding member 242 may include a peeler 244 (e.g., a pointed edge, or the like) that aids in directing the first end 322 of the mailer blank 300 away from the transport assembly 20, such as away from the conveyor 30. The first folding member 242 may pivot from a first folding position 206 to a second folding position 208. For example, a portion of the first folding member 242 may be biased against another member, may be moved by a pivot drive (e.g., motor, solenoid, actuator, or the like), or may utilize other features to allow the first folding member 242 to move (e.g., pivot, or the like) for folding the mailer blank 300. Additionally, the second folding member 250 may comprise a tuck portion 252 (e.g., plate, or the like) with a tuck edge 254. The second folding member 250 (e.g., the tuck position 252) may hold down the mailer blank 230 and allow the mailer blank 300 to be folded around the second folding member 250 (e.g., around the tuck edge 254). The second folding member 250 may also have a guide portion 256 against which the mailer blank 300 may be folded as the first folding member 242 pivots between the first folding position 206 and the second folding position 208. As the first folding member 242 pivots towards the second folding member 250, a mailer aperture 258 may be created by the first folding member 242 and the second folding member 250, which allows the folded mailer to pass through the members 240 and exit the folding system 200.

It should be understood that one more sensors 50 may be operatively coupled to the transport assembly 20 and/or the folder assemblies 200 (e.g., be a part of, communicate with, or the like). The one or more sensors 50 may be utilized to identify when a mailer blank 300 and/or a mailer 350, or any portions thereof, are moving along the transport assembly 20 at a specific position, located within the folding system 200, exiting the folding system 200, or the like. The one or more sensors 50 may be any type of sensor, such as a camera, infrared, laser, light curtain, electrical, LiDAR, and/or the like that determines the presence of a mailer blank 300 and/or mailer 350 at one or more locations within the mailer apparatus 10. That is, the one or more sensors 50 may identify the presence of the mailer blank 300 by identifying the size, shape, indicia (e.g., words, color, marks, tags, labels, barcodes, or the like of the mailer blank 300), blank surfaces 302, 304, blank edges 310 (e.g., first blank edge 312, second blank edge 314, or the like), blank ends 320 (e.g., first blank end 322, second blank end 324, or the like), or other portion of the mailer blank 300. Moreover, the one or more sensors 50 may be utilized to identify the presence of an already folded mailer 350 by identifying the size, shape, indicia (e.g., words, color, marks, tags, labels, barcodes, or the like on the mailer 350), mailer surfaces 352, 354, mailer edges 360 (e.g., first mailer edge 362, second mailer edge 364, or the like), mailer ends 370 (e.g., first mailer end 372, second mailer end 374, or the like), or other portion of the mailer 350.

FIGS. 6-11B illustrate that a sealing system 70 may be operatively coupled to the transport assembly 20 and/or the folding system 200 (e.g., be a part of, communicate with, or the like). The sealing system 70 may be any type of system that is used to form a sealant on the mailer blank 300. The sealing system 70 may apply, expose, wet, or the like a sealant for the mailer blank 300, such as on the edges 310 of the mailer blank 300. The mailer blank 300 may be formed into the mailer 350 by folding the mailer blank 300 and engaging the sealant between two surfaces of the mailer blank 300. In the illustrated embodiment, the sealing system 70 comprises a gluing system 72 and the sealant is glue that is applied to the first and second edges 312, 314 of the mailer blank 300. However, in other embodiments of the invention, the sealing system 70 may be other types of systems that apply other types of sealant on the mailer blank 300, such as tape, adhesives, or the like; exposes a portion of the mailer blank 300 to reveal a sealant (e.g., removes a protective layer); wets a portion of a mailer blank 300 to activate a sealant (e.g., water activated adhesive, or the like); or otherwise forms the sealant on the mailer blank 300 before and/or during folding of the mailer blank 300.

One or more securing systems 80 may be operatively coupled to the transport assembly 20 and/or the folding system 200 (e.g., be a part of, communicate with, or the like). The one or more securing systems 80 may have one or more securing members 82 that may be used to apply pressure to the folded mailer in order to aid in allowing the sealant to seal and form the mailer 350. In the illustrated embodiment in FIGS. 8B, 9B, 10B, and 11B, the one or more securing members 82 comprise one or more pairs of securing rollers 84, such as a first securing roller 86 and a second securing roller 88 that pinch a portion of the folded mailer where the sealant is located to aid in forming the mailer 350. In other embodiments of the invention, the one or more securing systems 80 may be other types of securing members 82, such as sleds, wipers, brushes, or the like.

The mailer folding apparatus 10 may further comprise one or more adjustment systems 260. In some embodiments the adjustment system 260 may be operatively coupled to the transport system 20. As illustrated in FIGS. 1-4, the one or more adjustment systems 260 adjusts the mailer folding apparatus 10 to account for mailer blanks 300 and/or mailers 350 of different sizes and/or shapes (e.g., of different widths, or the like). In the embodiments illustrated in FIGS. 1-4, the adjustment system 260 may comprise an adjustment drive 262 (e.g., a manual drive as illustrated in the figures, an automatic drive, or the like), adjustment rails 264, adjustment shafts 266, or the like. The one or more adjustment rails 264 may be parallel to the transport systems 20 (e.g., the conveyor 30) and one or more of the one or more adjustment rails 264 may move transversely with respect to one or more adjustment shafts 266. The one or more sensors 50, one or more sealing systems 70, one or more securing systems 80, and/or the like may be operatively coupled to the adjustment systems 260 (e.g., adjustment rails 264, or the like) such that when the one or more adjustment rails 262 move, the one or more sensors 50, one or more sealing systems 70, one or more securing systems 80, and/or the like move with the adjustment rails in order to position these systems for mailers of different sizes. In some embodiments, the adjustment systems 260 may be controlled through the use of the controller 90, which will be described in further detail herein.

As previously discussed, it should be understood that multiple folding assemblies 200 may be utilized within the mailer folder apparatus 10. For example, the mailer folder apparatus 10 may comprise a first folding assembly 12 and a second folding assembly 14 in-line with the first folding assembly 12. As such, the first folding assembly 12 and the second folding assembly 14 may operate to fold mailer blanks 300 at the same time (e.g., alternating mailer blanks 300). It should be understood that the first folding assembly 12 and the second folding assembly 14 may have the same or different components (e.g., assemblies, systems, or the like), and as such, may have one or more or all of the components discussed herein. As will be described in further detail with respect to the process flow in FIG. 12, a first folding assembly 12 may allow an initial mailer blank 300 to bypass the first folding assembly 12, which is engaged by the second folding assembly 14 to create an initial mailer 350. At the same or similar time, the first folding assembly 12 may engage a secondary mailer blank 300 to create a secondary mailer 350. Moreover, as the secondary mailer 350 travels through the transport assembly 20 the second folding assembly 14 allows the secondary mailer 350 to by-pass the second folding assembly 14. The first folding assembly 12 continues to allow alternate mailer blanks 300 to by-pass the first folding assembly 12, while the second folding assembly 14 continues to allow the folded mailers 350 created by the first folding assembly 12 to by-pass the second folding assembly 14. As will be described in further detail herein, the use of multiple folding assemblies 100, in particular, in-line folding assemblies allows for more efficient formation of the mailers 350 (e.g., doubling the number of mailers, or the like as will be discussed). It should be understood that in some embodiments two or more folding assemblies 200 may be utilized (e.g., three folding assemblies which allow the two mailer blanks 300 bypass the first folding assembly, a mailer blank 300 and a folded mailer 350 to bypass the second folding assembly, and two folded mailers 350 to bypass the third folding assembly).

FIG. 12 illustrates a method of forming mailers 350 using the mailer folding apparatus 10 discussed herein. As illustrated by block 402 of FIG. 12, the mailer folding apparatus 10 receives the first mailer blank 300. As previously discussed, the mailer blank 300 may be manually provided to the mailer folder apparatus 10, may be automatically provided to the mailer folder apparatus 10, may be fed to the mailer folder apparatus 10 from another part of the mailer folder apparatus 10 or from another machine, or the like. For example, the mailer blanks 300 may be cut (e.g., by dies) from a sheet of one or more materials (e.g., a single layer, multiple layers of materials) and fed to the mailer folder apparatus 10.

FIG. 12 illustrates in block 404 that one or more sensors 50 identify the presence of a mailer blank 300. For example, the sensor 50 may determine that a mailer 300 is located on the conveyor 30 of the transport system 20 adjacent to a folding system 200 (e.g., a first folding system 12). When the presence of a mailer blank 300 is identified, as illustrated by block 406 of FIG. 12, a sealant system 70 may be activated. As previously discussed herein, the sealant system 70 may be located before the folder system 200 (e.g., upstream of the first folder system 12) or it may be a part of the folder system 200 (e.g., within the first folder system 12). The sealing system 70 forms the sealant (e.g., applies the glue, exposes an adhesive, wets water activated sealant, or the like) on a portion of the mailer blank 300. For example, the sealant system 70 may be a glue system 72 that applies glue to a portion of the opposing edges 312, 314 (and in some embodiments a fold-line) of the mailer blank 300.

Block 408 of FIG. 12 further illustrates that as a mailer blank 300 enters the folding system 200 (e.g., the first folding assembly 12), the folding system 200 is activated (e.g., may occur before, during, or after other steps described in this process). In some embodiments, the engagement system 160 engages the folder system 200 for folding the mailer blank 300. For example, in the embodiment illustrated in FIG. 7A, the engagement drive 162 of the engagement system 160 may move the engagement member 164 located between the carriage 130 and the folding system 200 to engage the mailer feeder 220 with a portion of a mailer blank 300 located on the conveyor 30, as illustrated by the arrow A. For example, the mailer feeder 220 (e.g., the one or more rollers 222 and/or one or more belts 229, 239) may be engaged with the mailer blank 300, and activated (e.g., activate the feeder drive 210 to begin rotating the rollers 222, or the like) to move the mailer blank 300 through the folder system 200.

Figure 7A:
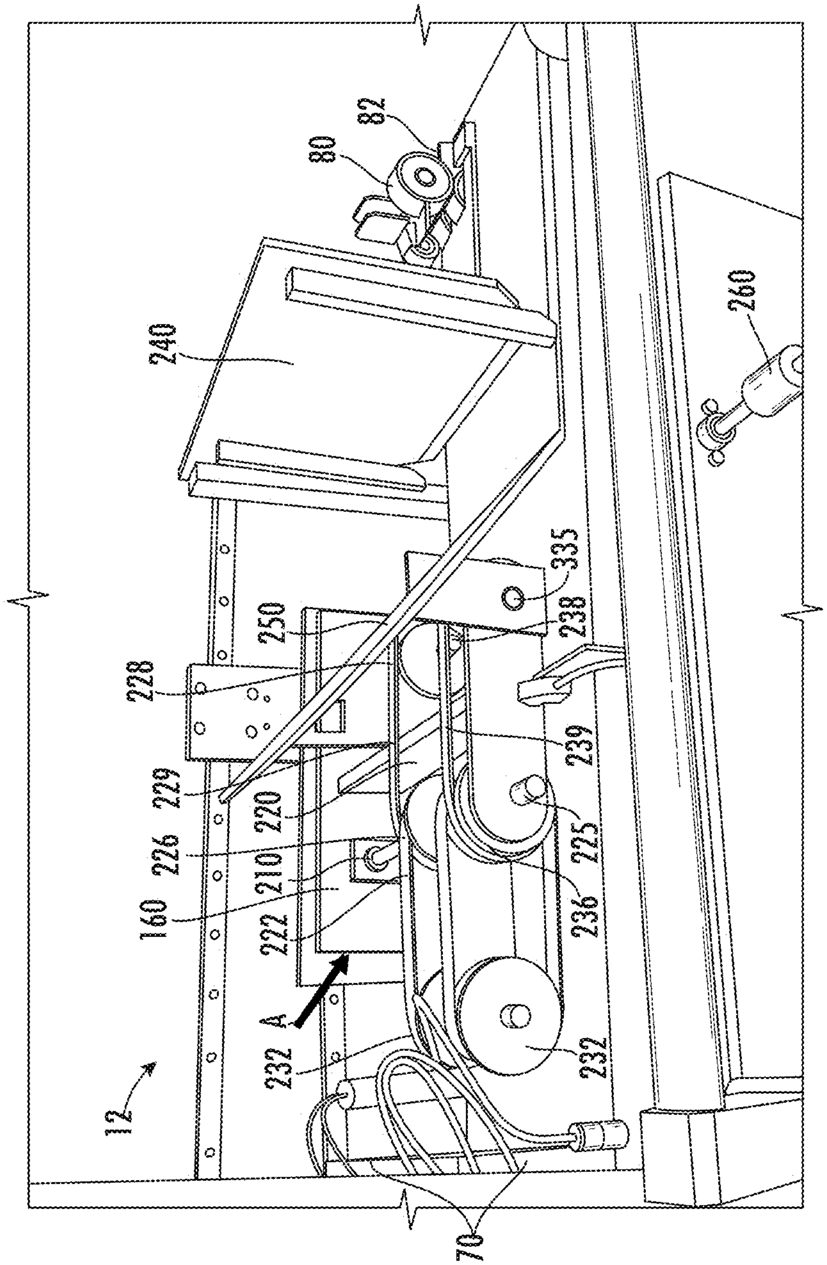
FIG. 7A is a side perspective view of a folding assembly having a carriage system and a folding system for receiving a mailer blank in a first position, in accordance with embodiments of the present disclosure.
Figure 7B:
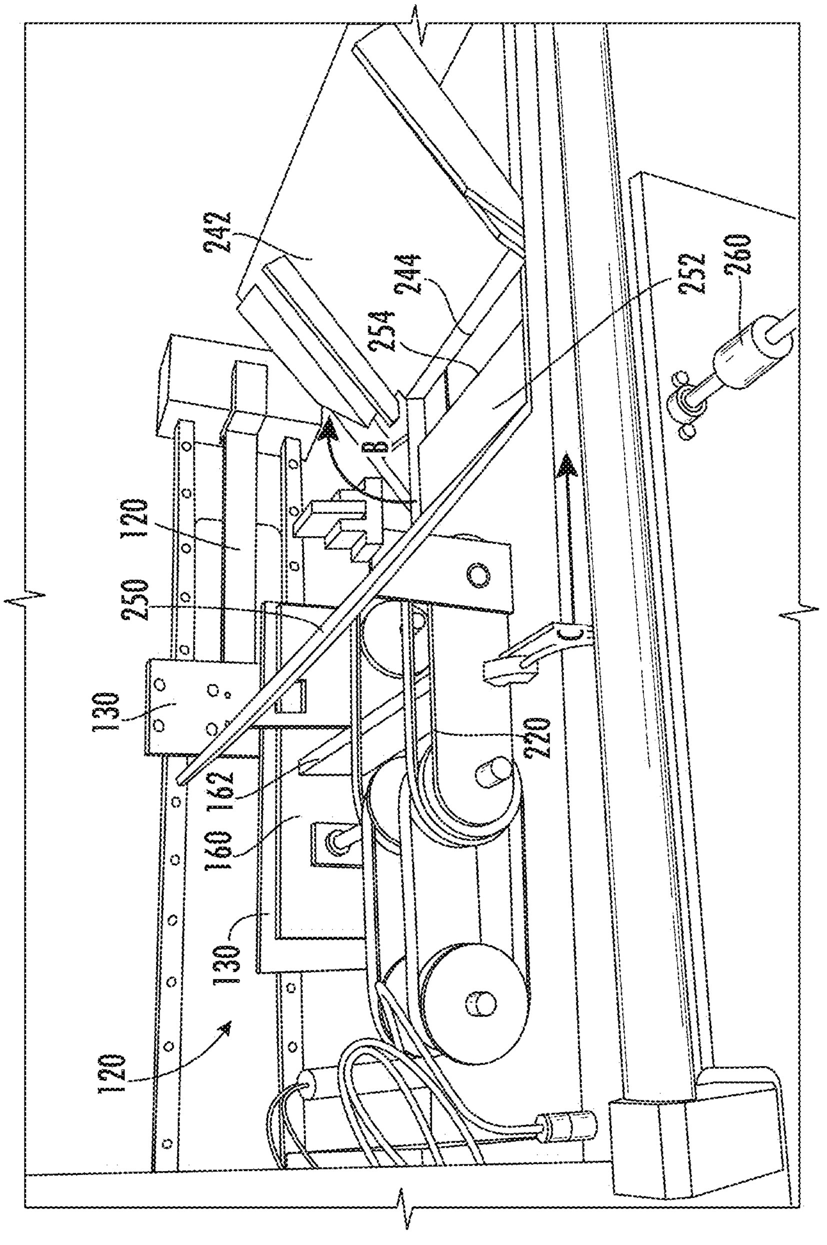
FIG. 7B is a side perspective view of a carriage assembly moving a folding system towards a second position and feeding the mailer blank through the folding system, in accordance with embodiments of the present disclosure.
Figure 8A:
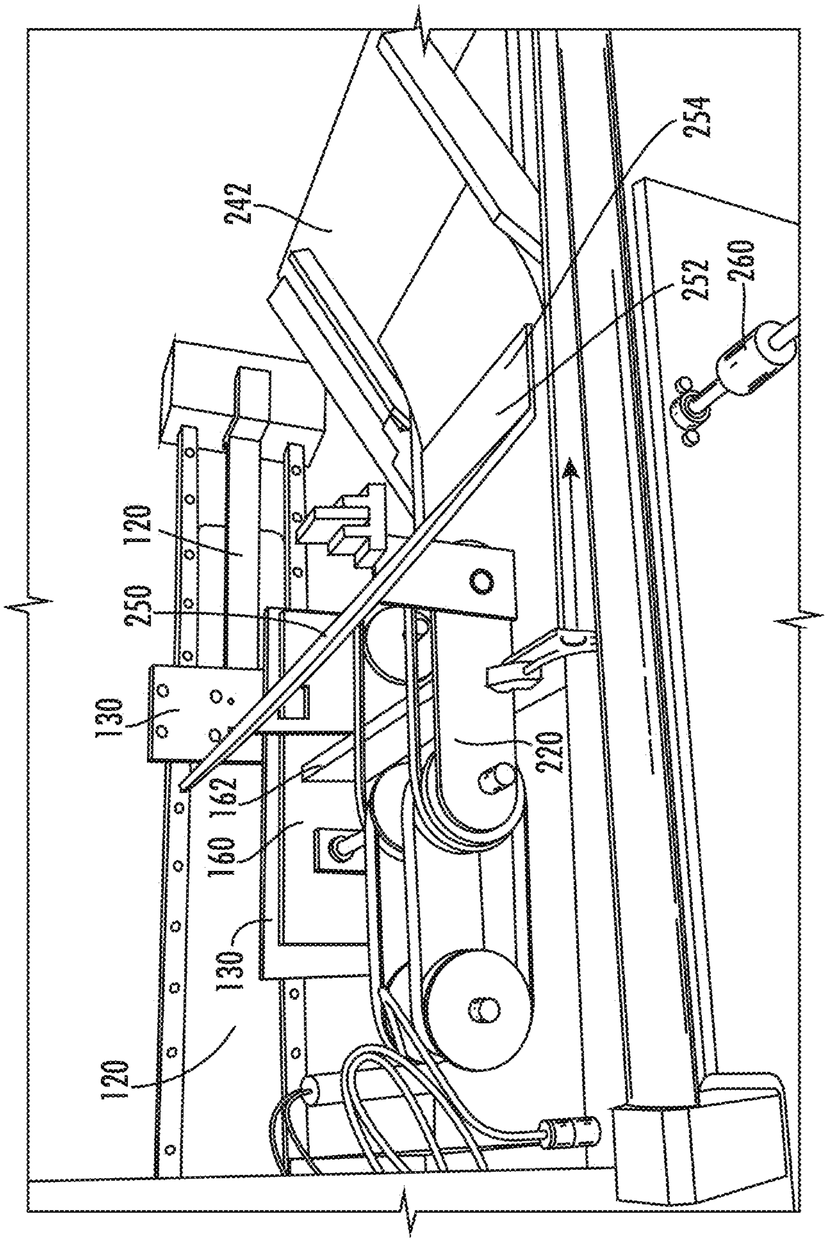
FIG. 8A is a side perspective view of the feeder system moving the mailer blank through the folding system, in accordance with embodiments of the present disclosure.
Figure 8B:
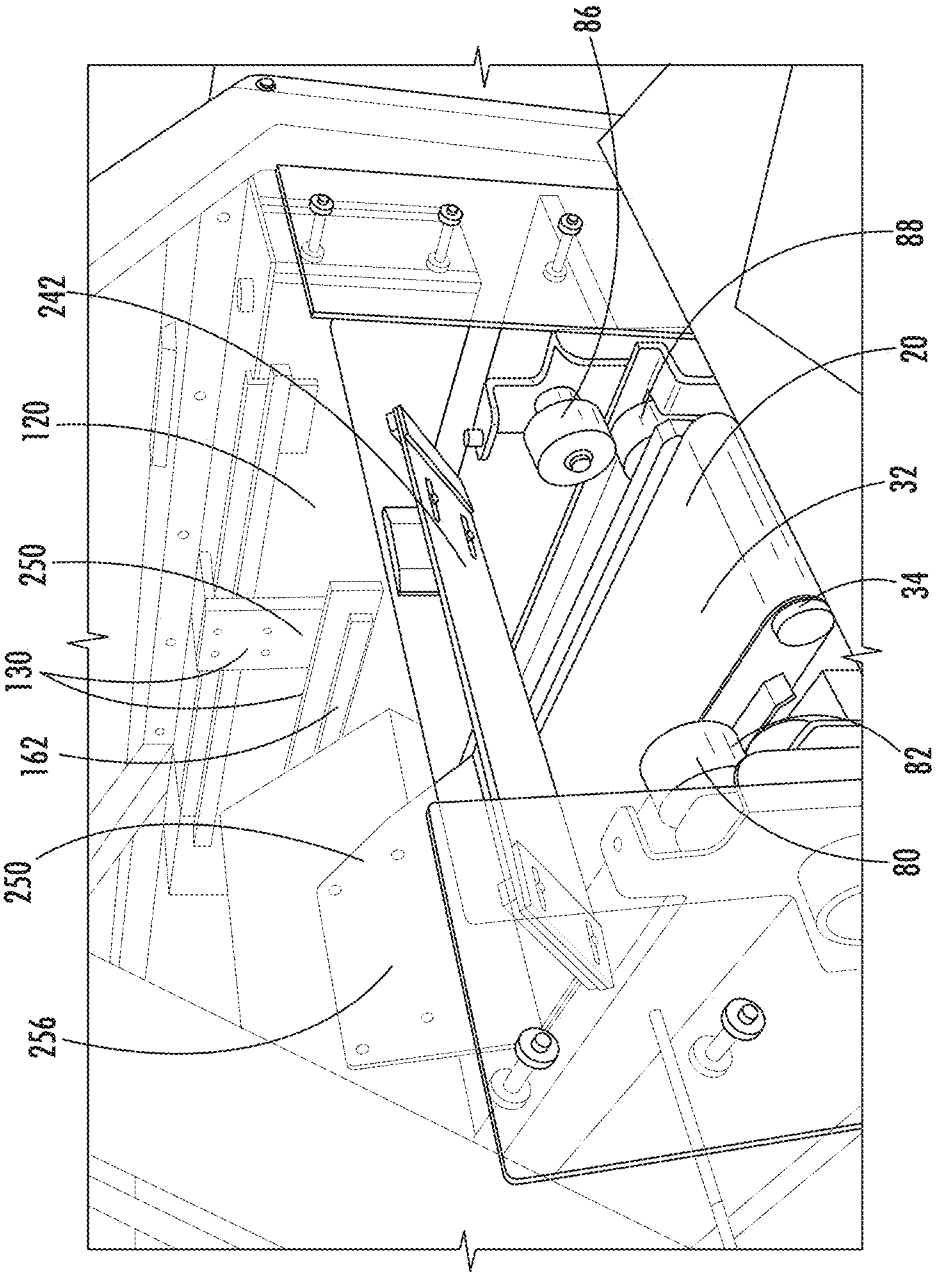
FIG. 8B is a rear perspective view of the folding system illustrated in FIG. 8A, in accordance with embodiments of the present disclosure.
Figure 9A:
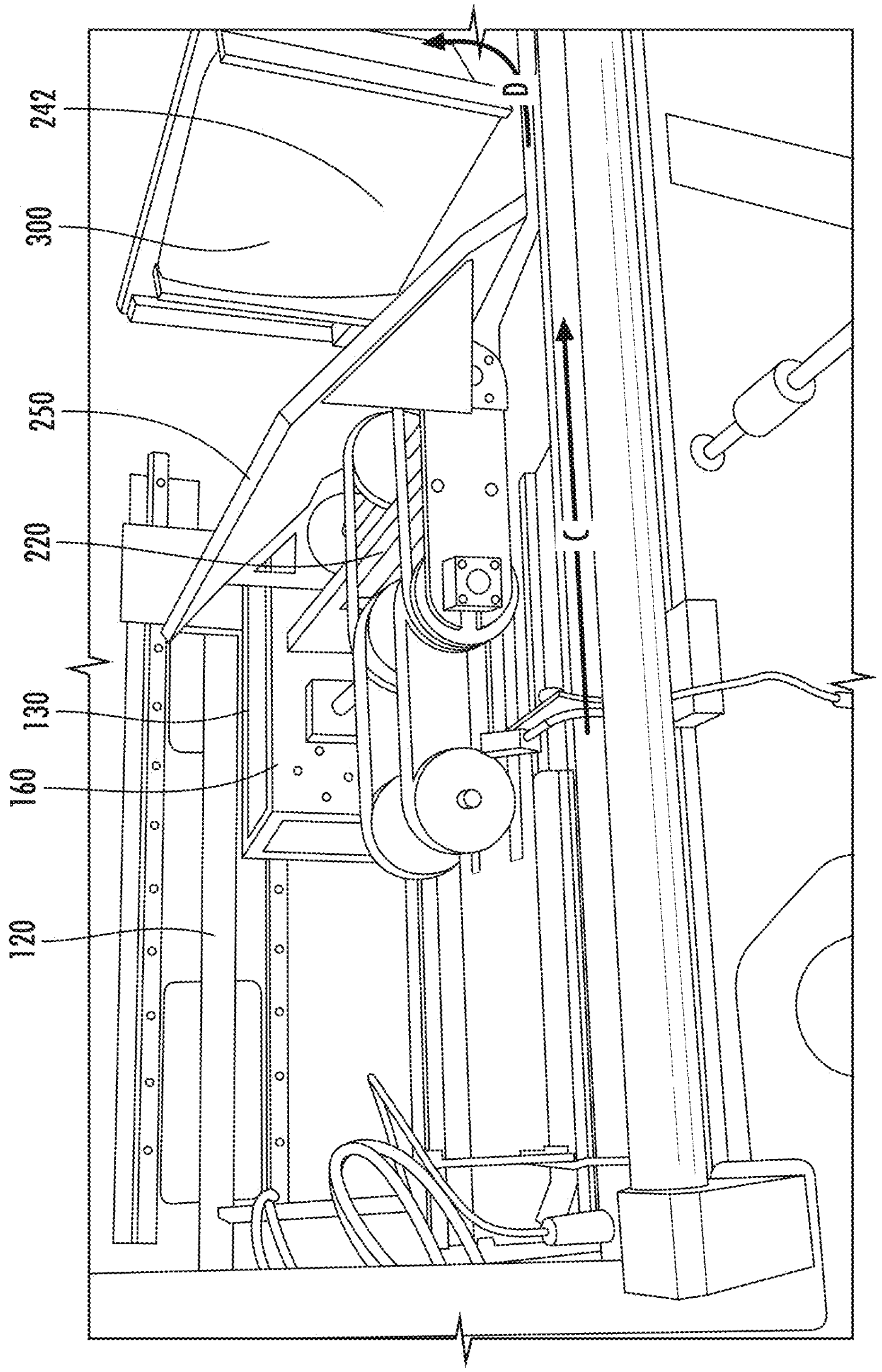
FIG. 9A is a side perspective view of a folding member of the folding system folding the mailer blank, in accordance with embodiments of the present disclosure.
Figure 9B:
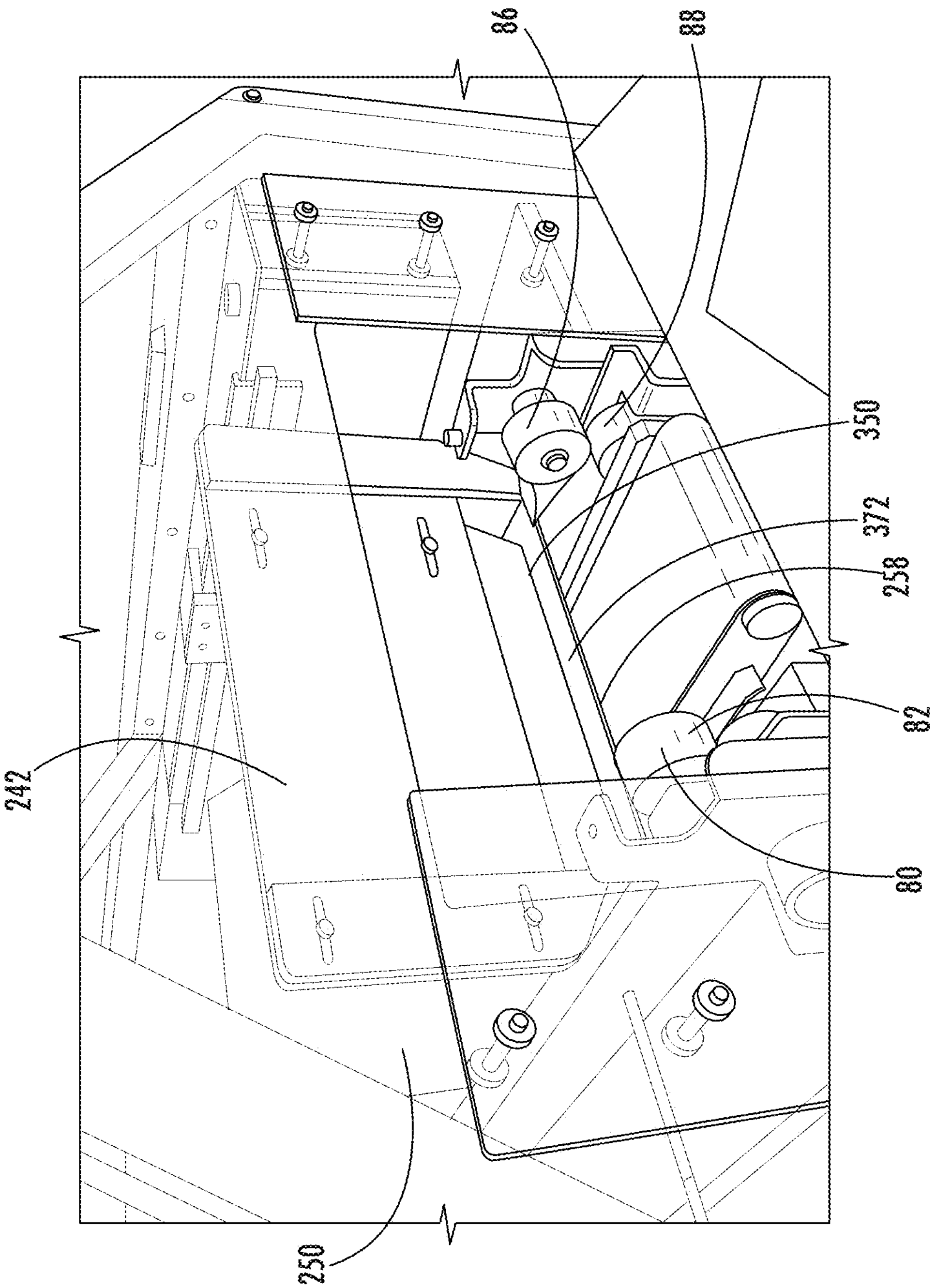
FIG. 9B is a rear perspective view of the folding system illustrated in FIG. 9A, in accordance with embodiments of the present disclosure.
Figure 10A:
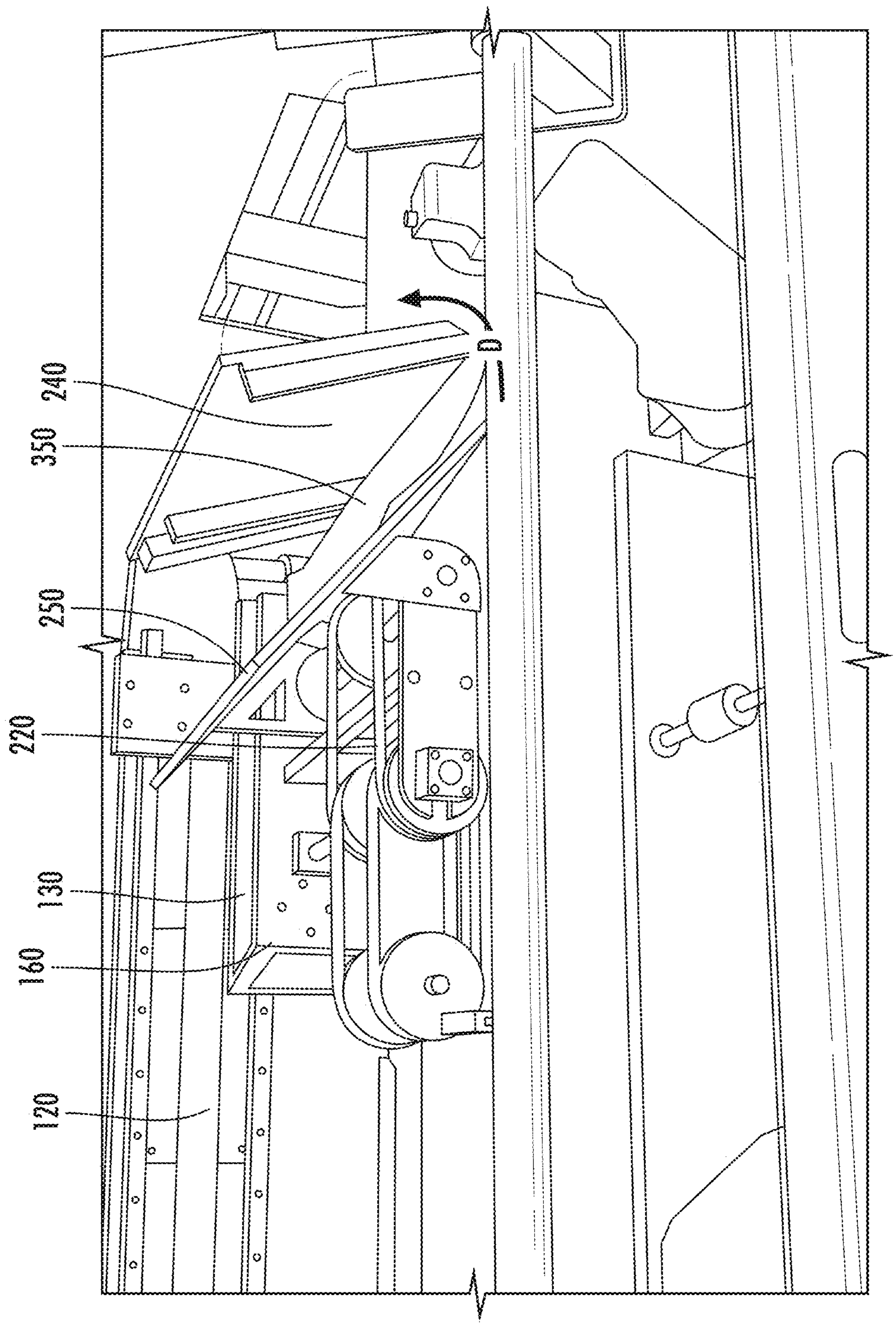
FIG. 10A is a side perspective view of the folding system with a folded mailer moving out of the folding system, in accordance with embodiments of the present disclosure.
Figure 10B:
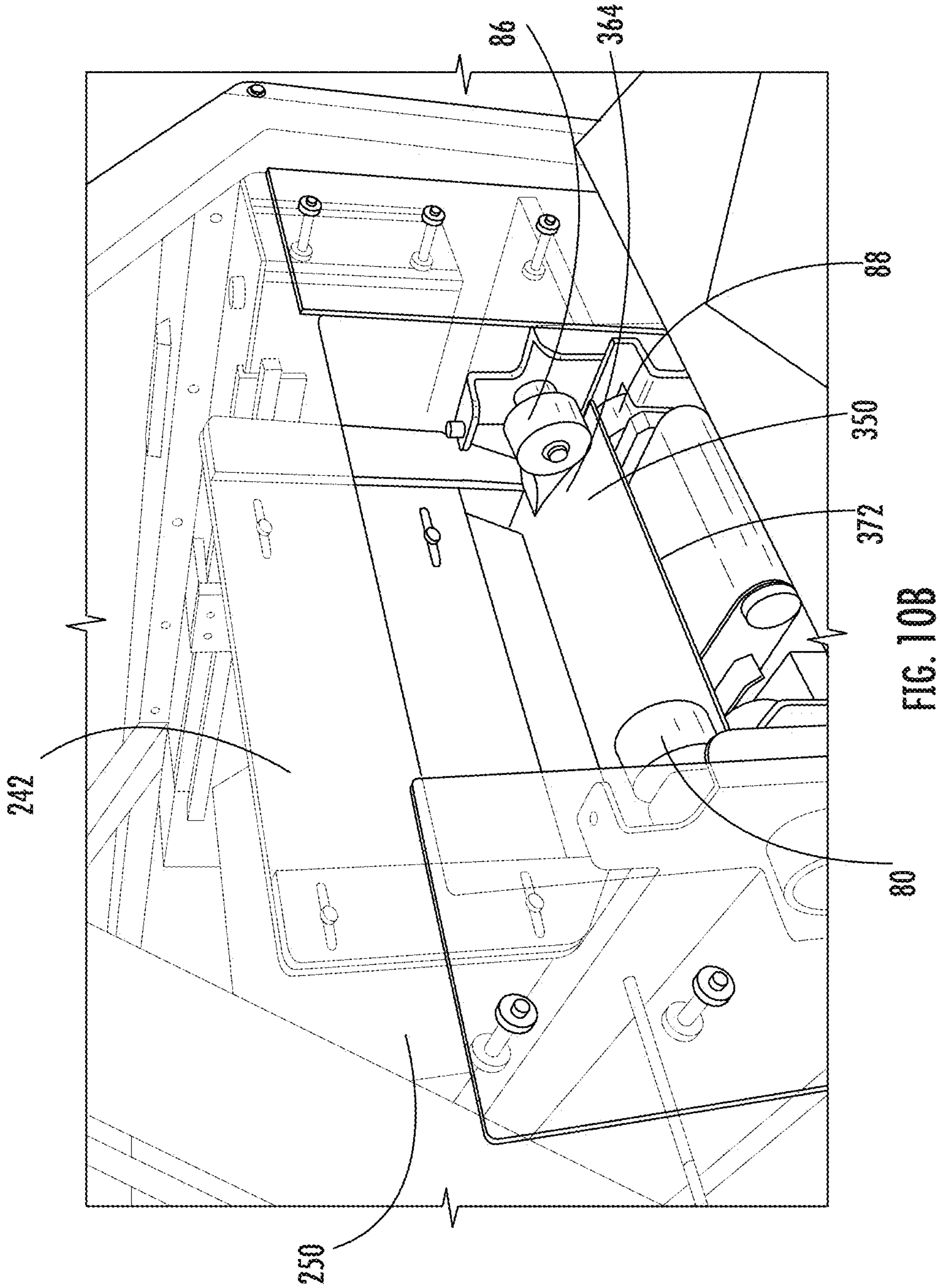
FIG. 10B is a rear perspective view of the folding system illustrated in FIG. 10A, in accordance with embodiments of the present disclosure.
Figure 11A:
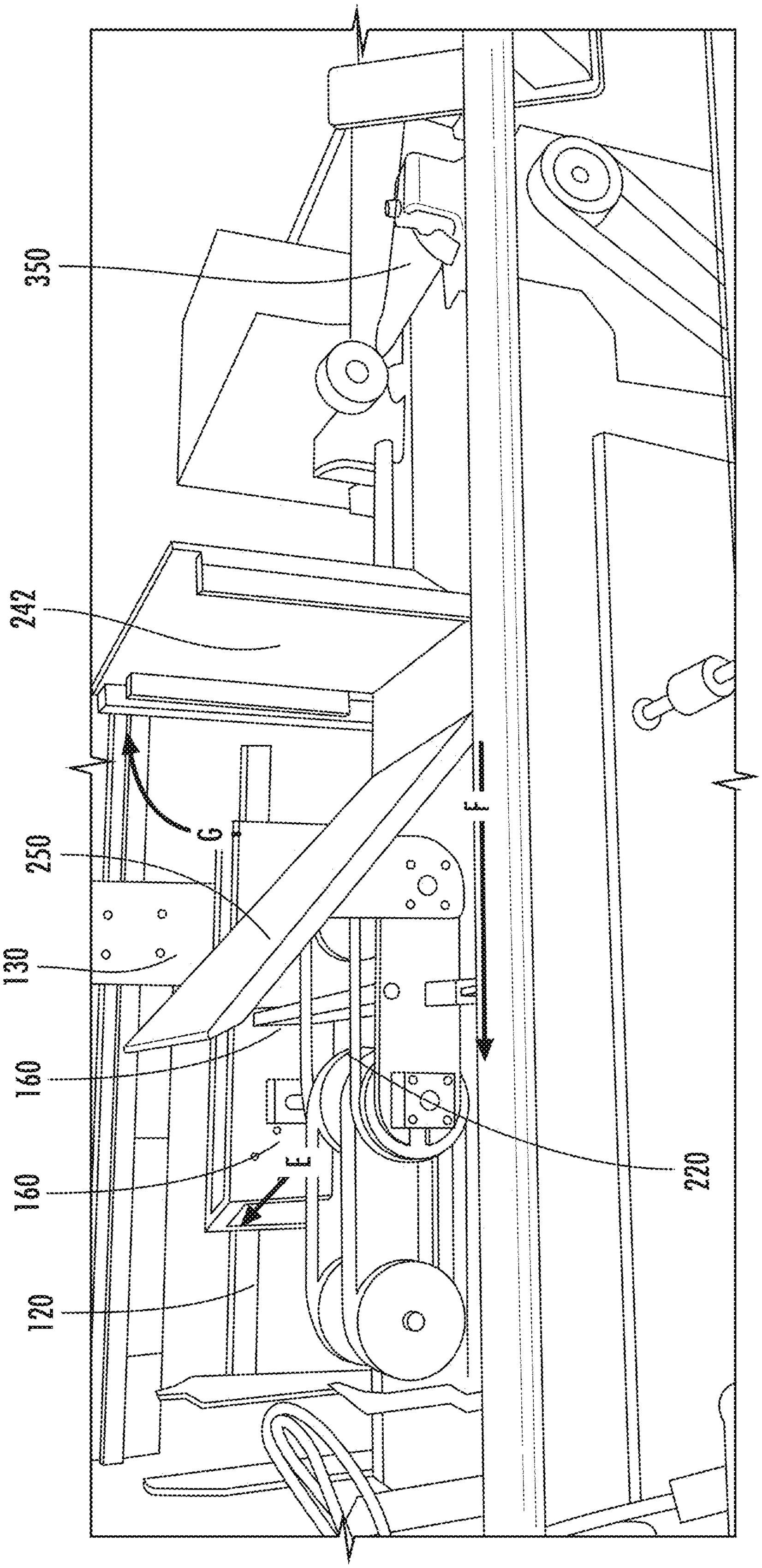
FIG. 11A is a side perspective view of a carriage system returning the folding system back to the first position and the folding member back to a starting position, in accordance with embodiments of the present disclosure.
Figure 11B:
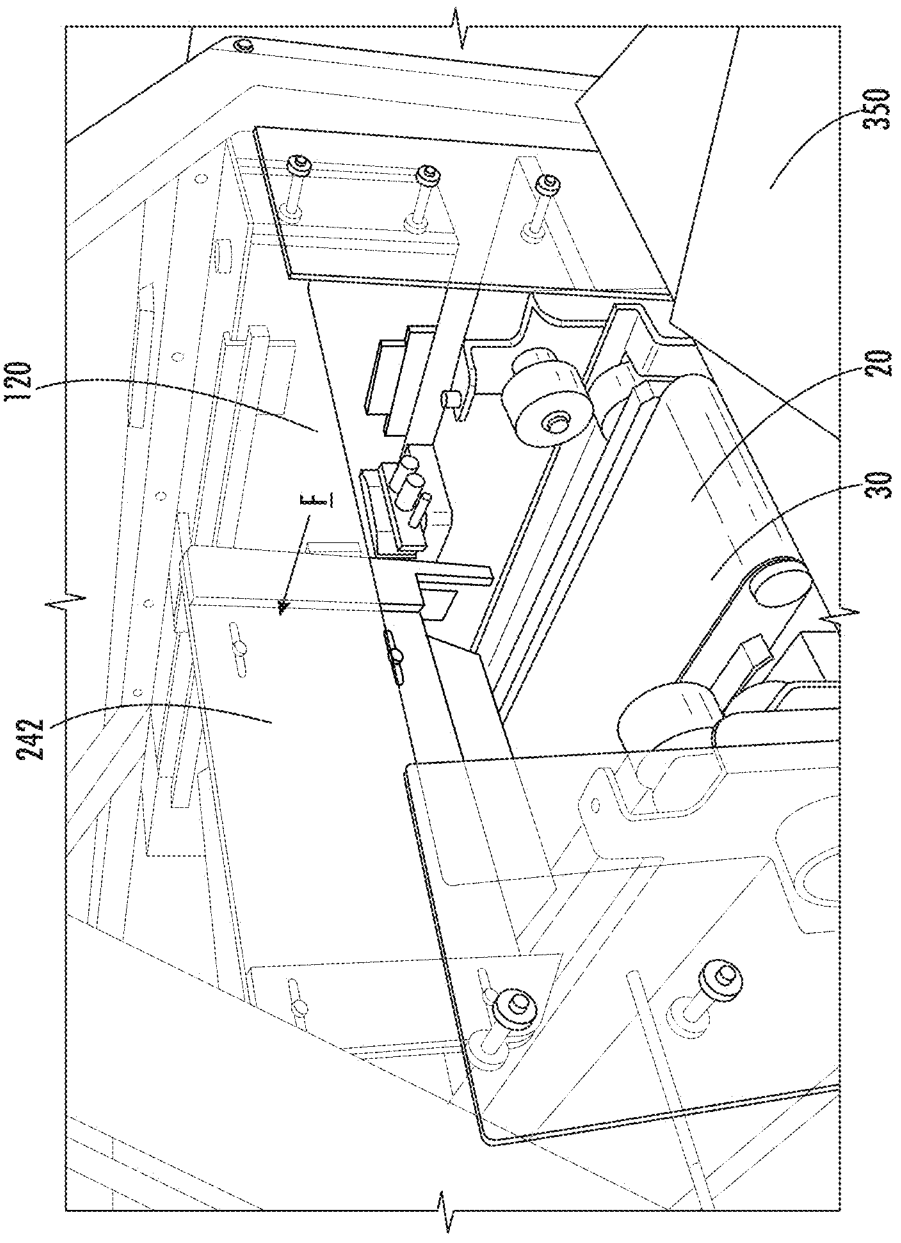
FIG. 11B is a rear perspective view of the folding system illustrated in FIG. 11A, in accordance with embodiments of the present disclosure.

FIG. 12 further illustrates in block 410, the folder system 200 itself may begin to move from a first position 202 to a second position 204 (e.g., may occur before, during, or after other steps described in this process), as illustrated by arrow C in FIG. 7B. For example, in the illustrated embodiment, the carriage system 110 may be activated. That is, a carriage 130 that is operatively coupled to the folder system 200 may move along a carriage track 120 to move the folder system 200 between the first position and the second position relative to the transport system 20 (e.g., the conveyor 30). The first position may include a position in which the mailer blank 300 is received or about to be received by the folding system 200 from the conveyor 30, while a second position may include a position in which the folded mailer 350 is exiting or about to exit the folding system 200. It should be further understood that the mailer feeder 220 and/or the movement of the folding system 200 moves the mailer blank 300 and/or the folded mailer 350 at the same or similar speed at which the transport system 20 (e.g., the conveyor 30) moves the mailer blank 300 and/or the folded mailer 350 through the transport assembly 20. The movement of the folding system 200 (e.g., carriage speed) and/or mailer feeder 220 (e.g., feeder speed) provides improvements over conventional folding machines in that the mailer blank 300 is being folded at a reduced folding speed (e.g., less than the transport speed and/or static) while the folding system 200 is moving relative to the conveyor 30 (e.g., at the same or similar speed as the transport speed of transport system 20). By folding the mailer blank 300 at a slower speed (e.g., a folding speed slower than a transport speed and/or static as the folding system 200 moves, or the like) the mailer blank 300 is more easily folded into the mailer 350; however, the mailer blank 300 and/or mailer 350 are still moving within the transport system 20 so as not to increase the time it takes to create the mailer 350. Without the movement of the folding system 200 and/or movement of the mailer blank 300 by the mailer feeder 220, the movement of the mailer blank 300 would have to be reduced and/or stopped for folding, and thereafter, the folded mailer would have to be moved again increasing the time it takes to create the mailer 350 (e.g., increasing the time to move the mailer blank 300 and/or mailer 350 through the transport system 20).

Block 412 of FIG. 12 further illustrates that the folding system 200 is used to fold the mailer blank 300 into the folded mailer 350. For example, a first folding member 242 may be rotated to a first folding position as illustrated by arrow B in order to receive a first end 312 of the mailer blank 300. As such, a peeler 244 of the first folding member 242 may direct the first end 322 of the mailer blank 300 away from the transport system 20 (e.g., peel the first end 322 off of the conveyor 30). The first folding member 242 may be positioned at an angle with respect to the travel of the mailer blank 300 along the transport system 20 (e.g., the conveyor 30), and as such may begin to bend a first portion of the mailer blank 300 as it travels up the first folding member 242. The first folding member 242 may then pivot with respect to the second folding member 250 (e.g., as previously discussed by being biased based on the movement of the folding system 200, through a pivot drive, or the like) from the first folding position to the second folding position as illustrated by arrow D in FIGS. 9A and 10A. The pivoting of the first folding member 242 folds a first portion of the mailer bank 300 over a second portion of the mailer blank 300 around a second member 250 that holds down, guides, and/or provides a location for creating the fold at the mailer end 372 of the mailer 350. For example, as previously discussed, the mailer blank 300 may be held down and guided by a tuck portion 252, and the mailer blank 300 may be folded around the tuck portion 252 (e.g., around a tuck edge 254) and against a guide member 256 of the second folding member 250.

As illustrated by block 414, the folded mailer 350 may begin to exit the folding system 200, such as through a folding aperture 258 created between the first folding member 242 and second folding member 250. Moreover, block 416 of FIG. 12 illustrates that the engagement system 160 moves the mailer feeder 220 from the engaged position to the disengaged position as illustrated by arrow E, the folding system 200 moves from the second position back to the first position as illustrated by arrow F, and/or the first folding member 242 pivots as illustrated by arrow Gin FIG. 11A. For example, the engagement actuator 162 moves the engagement member 164 to lift the mailer feeder 220 from the conveyor 30, the carriage 130 moves with respect to the carriage track 120 to move the folder system 200 to the first position, and/or the first folding member 242 pivots (e.g., to a static position between the first folding position and the second folding position, or the like). Furthermore, as illustrated by block 418 the one or more mailer securing systems 80, such as the one or more securing members 82 may apply pressure to the folded mailer 350 where the sealant is located (e.g., at the edges 310, or the like) to aid in forming and/or sealing the mailer 350. It should be understood that at least the steps of blocks 414, 416, and 418 may occur before, during, or after each other.

The processes of blocks 402 through 418 may occur with respect to either of the folding assemblies 100 (e.g., a first folding assembly 12, a second folding assembly 14, or the like). However, in the embodiments where two or more folding assemblies are utilized, the first folding assembly 12 operates to create a first mailer 350. Moreover, the second folding assembly 14 determines when a mailer blank 300 has by-passed the first folding assembly 12 and is approaching the second folding assembly 14, or when a mailer 350 formed by the first folding assembly 14 is approaching second folding assembly 14. As such, as illustrated by block 420 of FIG. 12, a second sensor 50 may determine the presence of a mailer 350 and/or a mailer blank 300.

Block 422 of FIG. 12 illustrates when a mailer 350 is identified, the mailer feeder 220 of a second folder system 200 remains disengaged, and thus, allows the mailer 350 to by-pass the second folding assembly 14. For example, the mailer 350 may be allowed to pass under the second folding system 200 for further processing (e.g., for automated or manual handling for future use, for filling with a product, or the like). Block 424 of FIG. 12 further illustrates that when a mailer blank 300 is identified, the mailer feeder 220 of the second folder system 200 is engaged and the folding system 200 operates as previously discussed with respect to blocks 406 through 418 to create the mailer 300 from the mailer blank 350.

The present mailer folding machine 10 disclosed herein has improvements over conventional folding systems. For example, by allowing the mailer folding systems 200 to move with respect to the transport system 20 (e.g., at a carriage speed) and/or the mailer feeder 200 to move the mailer blank 300 through the folding system 200 (e.g., at a feeder speed through the mailer feeder), the mailer blank 300 can be folded within the folding system 200 at folding speed that is reduced, or static, with respect to the transport speed at which a mailer blank 300 or mailer 350 would be moving through the transport system 20. By folding the mailer blank 350 at a speed lower than the speed of the transport system 20 (e.g., at a reduced folding speed or static) the quality of the mailer 350 is improved (e.g., reduces unwanted creasing, bunching, misalignment, or the like), while still moving the mailer blank 300 and/or folded mailer 350 down the conveyor 30 through the movement of the folding system 200 (e.g., at the carriage speed). Furthermore, by using multiple folding assemblies 100 (e.g., first folder assembly 12, second folder assembly 14, or the like) multiple folding systems 200 can be engaged and disengaged to allow mailer blanks 300 and/or mailers 350 to bypass the folding systems 200, which increases the number of mailers 350 formed and/or a speed at which the mailers 350 may be formed. For example, if the conveyor 30 is moving mailer blanks at 60 ft/sec, but two folding systems 200 are operating along the conveyor 30, the mailer folder apparatus 10 is creating at least twice as many mailers 350 at the a conveyor speed of 60 ft/sec when compared to a conventional system that folds a mailer at reduced speeds (e.g., having to slow the conveyor and/or stop the mailer) and/or uses only one system. As such, continuing with the example, the mailers 350 are effectively being created at speeds of 120 ft/sec or more.

The operation of the mailer folding apparatus 10, including the one or more folding assemblies 100 (e.g., folding system 200, carriage system 110, engagement system 160, or the like), transport assembly 20 (e.g., conveyor 30, or the like), the sensors 50, the sealing systems 70, the securing systems 80, or other systems may be controlled by a programmable controller 90, which may communicate with the various assemblies and/or systems of the mailer folding machine 10 and/or other systems within a facility. As such, FIG. 13 illustrates a mailer network system 500, in accordance with embodiments of the present disclosure. As illustrated in FIG. 13, one or more mailer machine systems 510 are operatively coupled, via a network 502, to one or more user computer systems 520, one or more other machine systems 330, and/or one or more other systems (not illustrated). In this way, the mailer machine systems 510 operate the mailer folding machine 10 and/or may communicate with one or more other machine systems for controlling operation of other machine components upstream or downstream of the mailer folding machine 10. The mailer machine systems 510 may communicate with user computer systems 520 to allow the user computer systems 520 to monitor and/or control the mailer folder machine 10. Moreover, the mailer machine systems 510 may communicate with other systems, such as mailer supply systems (not illustrated) to request mailer blanks 300 when a determination is made that the additional mailer blanks 300 for the mailer folding machine 10 are needed. The communications may occur over a network 502, as will be described in further detail herein.

The network 502 may be a global area network (GAN), such as the Internet, a wide area network (WAN), a local area network (LAN), or any other type of network or combination of networks. The network 502 may provide for wireline, wireless, or a combination of wireline and wireless communication between systems, services, components, and/or devices on the network 502.

As illustrated in FIG. 13, the one or more mailer systems 510 may comprise a controller 90 that may generally comprise one or more communication components 512, one or more processing components 514, and one or more memory components 516. The one or more processing components 514 are operatively coupled to the one or more communication components 512, and the one or more memory components 516. As used herein, the term "processing component" generally includes circuitry used for implementing the communication and/or logic functions of a particular system. For example, a processing component may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 514 may include functionality to operate one or more software programs based on computer-readable instructions thereof, which may be stored in the one or more memory components.

The controller 90 components, such as the one or more communication components 512, may be operatively coupled to the one or more folding assemblies 100 (e.g., one or more folding systems 200, one or more carriage systems 110, one or more engagement systems 160, or the like), one or more transport assemblies 20 (e.g., one or more conveyors 30, or the like), one or more sensors 50, one or more sealing systems 70, one or more securing systems 80, one or more adjustment systems 260, or other systems, as previously described herein.

The one or more processing components 514 use the one or more communication components 512 to communicate with the network 502 and other components on the network 502, such as, but not limited to, the components of the one or more user computer systems 520, the one or more other machine systems 530, and/or the one or more other systems (not illustrated). As such, the one or more communication components 512 generally comprise a wireless transceiver, modem, server, electrical connection, electrical circuit, or other component for communicating with other components on the network 502. The one or more communication components 512 may further include an interface that accepts one or more network interface cards, ports for connection of network components, Universal Serial Bus (USB) connectors, or the like. Moreover, the one or more communication components 512 may include a keypad, keyboard, touch-screen, touchpad, microphone, mouse, joystick, other pointer component, button, soft key, and/or other input/output component(s) for communicating with the users. In some embodiments, as described herein the one or more communication components 512 may comprise a user interface, such as a graphical user interface 92 that allows a user to control and/or monitor the operation of the mailer folding machine 10, upstream systems, and/or downstream systems.

As further illustrated in FIG. 13, the one or more mailer machine systems 510 comprise computer-readable instructions 518 stored in the one or more memory components 516, which in some embodiments includes the computer-readable instructions 518 of the one or more mailer folding applications 517 (e.g., used to operate the mailer folding machine 10 and/or the components thereof, or the like). In some embodiments, the one or more memory components 516 include one or more data stores 519 for storing data related to the mailer folding machines 10, including, but not limited to, data created, accessed, and/or used by the one or more mailer systems 510 to operate the one or more mailer folding machines 10.

As illustrated in FIG. 13, users may communicate with each other over the network 502 and the mailer machine systems 510, the other machine systems 530, and/or other systems in order to control and/or monitor the various systems remotely. Consequently, the one or more users 4 may be employees, agents, representatives, officers, or the like of an organization operating the facility. The one or more user computer systems 520 may be a desktop, laptop, tablet, mobile device (e.g., smartphone device, or other mobile device), or any other type of computer that generally comprises one or more communication components 522, one or more processing components 524, and one or more memory components 526.

The one or more processing components 524 are operatively coupled to the one or more communication components 522, and the one or more memory components 526. The one or more processing components 524 use the one or more communication components 522 to communicate with the network 502 and other components on the network 502, such as, but not limited to, the one or more mailer machine systems 510, the one or more other machine systems 530, and/or the other systems (not illustrated). As such, the one or more communication components 522 generally comprise a wireless transceiver, modem, server, electrical connection, or other component for communicating with other components on the network 502. The one or more communication components 522 may further include an interface that accepts one or more network interface cards, ports for connection of network components, Universal Serial Bus (USB) connectors and the like. Moreover, the one or more communication components 322 may include a keypad, keyboard, touch-screen, touchpad, microphone, mouse, joystick, other pointer component, button, soft key, and/or other input/output component(s) for communicating with the users. In some embodiments, the one or more communication components 522 may comprise a user interface, such as a graphical user interface that allows a user to remotely control and/or monitor the operation of the mailer folding machine 10.

As illustrated in FIG. 13, the one or more user computer systems 520 may have computer-readable instructions 528 stored in the one or more memory components 526, which in some embodiments includes the computer-readable instructions 528 for user applications 527, such as dedicated applications (e.g., apps, applet, or the like), portions of dedicated applications, a web browser or other apps that allow access to applications located on other systems, or the like. In some embodiments, the one or more memory components 526 include one or more data stores 529 for storing data related to the one or more user computer systems 520, including, but not limited to, data created, accessed, and/or used by the one or more user computer systems 520. The user application 527 may use the applications of the one or more mailer machine systems 510, the one or more other mailer systems 530, and/or one or more other systems (not illustrated) in order to communicate with other systems on the network 502 and take various actions described herein (e.g., operation, use, monitoring, or the like the mailer machine 10).

Moreover, as illustrated in FIG. 13, the one or more other machine systems 530 and/or other systems (not illustrated) have components the same as or similar to the components described with respect to the one or more mailer machine systems 510 and the one or more user computer systems 520 (e.g., one or more communication components, one or more processing components, one or more sensors, one or more memory devices with computer-readable instructions of one or more product applications, one or more datastores, or the like). Thus, the one or more other machine systems 530 may include upstream and/or downstream components that operate and/or communicate with the one or more mailer machine systems 510, the one or more user computer systems 520, and/or one or more other systems in same or similar way as previously described with respect to the one or more mailer systems 510, the one or more user computer systems 520, and/or the one or more other systems. The one or more other machine systems 530 may comprise the systems that operate the machines that produce and/or supply the one or more mailer blanks 300 and/or handle the mailers 350 formed by the mailer folding machine 10 (e.g., insert products into the mailers 350, seal the mailers 350, apply labels, and process the mailers 350 for shipping).

As will be appreciated by one of skill in the art in view of this disclosure, embodiments of the invention may be embodied as an apparatus, a system, computer program product, and/or other device, a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Several alternative examples have been described and illustrated herein. A person of ordinary skill in the art would appreciate the features of the individual embodiments and the possible combinations and variations of the components. A person of ordinary skill in the art would further appreciate that any of the examples could be provided in combination with the other examples disclosed herein. Additionally, the terms "first," "second," and "third" as used herein are intended for illustrative purposes only and do not limit the embodiments in any way.

As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof.

It will be understood that when an element is referred to as being "coupled" or "operatively coupled" (other similar phrase) to another element, the elements can be formed integrally with each other, or may be formed separately and put together. Furthermore, "coupled" or "operatively coupled" to can mean the element is directly coupled or operatively coupled to the other element, or intervening elements may be present between the elements. Furthermore, "coupled" or "operatively coupled" may mean that the elements are detachable from each other, or that they are permanently coupled together.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as top, bottom, front, rear, side, upper, lower, left, right, horizontal, vertical, upward, and downward merely describe the configuration shown in the figures. The referenced components may be oriented in an orientation other than that shown in the drawings and the terminology, therefore, should be understood as encompassing such variations unless specified otherwise. All structural and functional equivalents to the elements of the various aspects described throughout the disclosure that are known or later come to be known to those of ordinary skill in the art are expressly incorporated herein by reference and are intended to be encompassed by the claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, the subject matter lies in less than all features of a single disclosed configuration or operation. The claims are hereby incorporated into the detailed description, with each claim standing on its own as a separately claimed subject matter.

What is claimed is:

1. A mailer apparatus comprising:

a transport assembly, wherein the transport assembly moves a mailer blank at a transport speed;

a folding assembly operatively coupled to the transport assembly, wherein the folding assembly comprises:

a carriage system; and a folding system operatively coupled to the carriage system, the folding system comprising a mailer feeder that moves the mailer blank through the folding system at a feeding speed that is the same as the transport speed of the transport assembly;

wherein the folding assembly receives the mailer blank in a first position;

wherein the carriage system moves the folding system with respect to the transport assembly to a second position at a carriage speed that is the same as the transport speed while the folding system folds the mailer blank into a mailer at a folding speed that is less than the transport speed or while the mailer blank is static within the folding system; and wherein the carriage system returns the folding system to the first position to receive another mailer blank.

2. The mailer apparatus of claim 1, wherein the mailer feeder comprises:

one or more feeder rollers;

one or more feeder belts operatively coupled to the one or more feeder rollers; and one or more feeder drives.

3. The mailer apparatus of claim 1, wherein the folding assembly further comprises:

an engagement system, wherein the engagement system engages the mailer feeder for receiving the mailer blank and disengages the mailer feeder for allowing the mailer blank to bypass the folding system.

4. The mailer apparatus of claim 1, wherein the folding system further comprises:

a first folding member; and a second folding member;

wherein the first folding member receives the mailer blank in a first folding position, actuates between the first folding position to a second folding position to fold the mailer blank around the second folding member.

5. The mailer apparatus of claim 4, wherein the second folding member comprises a tuck portion with a tuck edge.

6. The mailer apparatus of claim 1, further comprising:

one or more sealing systems, wherein the one or more sealing systems activate a sealant on one or more blank edges of the mailer blank.

7. The mailer apparatus of claim 6, wherein the sealant is glue and the one or more sealing systems are one or more glue dispensers that dispense the glue on the one or more blank edges of the mailer blank.

8. The mailer apparatus of claim 6, further comprising:

one or more securing systems, wherein the one or more securing systems apply pressure to one or more mailer edges of the mailer.

9. The mailer apparatus of claim 8, wherein the one or more securing systems comprise:

a pair of rollers, wherein the pair of rollers apply pressure to the one or mailer edges of the mailer.

10. The mailer apparatus of claim 1, further comprising:

one or more sensors, wherein the one or more sensors identify a presence of the mailer blank to activate the folding assembly.

11. The mailer apparatus of claim 1, wherein the transport assembly comprises a conveyor that moves the mailer blank or the mailer.

12. The mailer apparatus of claim 11, wherein the conveyor comprises a roller conveyor, a belt conveyor, or a slide conveyor.

13. The mailer apparatus of claim 1, wherein the folding assembly comprises a first folding assembly comprising a first folding system and a first carriage system, and wherein the mailer apparatus further comprises:

a second folding assembly comprising:

a second carriage system; and a second folding system operatively coupled to the second carriage system;

wherein the first folding system receives first mailer blanks and folds the first mailer blanks into first mailers and allows second mailer blanks to bypass the first folding system; and wherein the second folding system receives the second mailer blanks and folds the second mailer blanks into second mailers and allows the first mailers to bypass the second folding system.

14. The mailer apparatus of claim 1, further comprising:

an adjustment system, wherein the adjustment system adjusts the folding assembly for mailer blanks or mailers of different widths.

15. A mailer apparatus comprising:

a transport assembly, wherein the transport assembly moves mailer blanks or mailers;

a first folding assembly operatively coupled to the transport assembly, wherein the first folding assembly comprises a first folding system; and a second folding assembly operatively coupled to the transport assembly, wherein the second folding assembly comprises a second folding system;

wherein the first folding system receives first mailer blanks and folds the first mailer blanks into first mailers and allows second mailer blanks to bypass the first folding system; and wherein the second folding system receives the second mailer blanks and folds the second mailer blanks into second mailers and allows the first mailers to bypass the second folding system.

16. A method of forming mailers using a mailer machine, the method comprising:

moving mailer blanks using a transport assembly operatively coupled to a first folding system and a second folding system;

receiving first mailer blanks at the first folding system, wherein the first folding system folds the first mailer blanks into first mailers and allows second mailer blanks to bypass the first folding system; and receiving the second mailer blanks at the second folding system, wherein the second folding system folds the second mailer blanks into second mailers and allows the first mailers to bypass the second folding system.

17. The method of claim 16, wherein the mailers are formed by:

moving the mailer blanks using a transport assembly;

receiving the mailers blanks at a folding assembly operatively coupled to the transport assembly, wherein the folding assembly comprises:

a carriage system; and a folding system operatively coupled to the carriage system; and wherein the folding assembly receives a mailer blank in a first position, the carriage system moves the folding system with respect to the transport assembly to a second position, the folding system folds the mailer blank into a mailer, and the carriage system returns the folding system to the first position.

18. A method of forming mailers using a mailer machine, the method comprising:

moving a mailer blanks using a transport assembly at a transport speed;

receiving the mailers blanks at a folding assembly operatively coupled to the transport assembly, wherein the folding assembly comprises:

a carriage system; and a folding system operatively coupled to the carriage system, the folding system comprising a mailer feeder that moves a mailer blank through the folding system at a feeding speed that is the same as the transport speed of the transport assembly; and wherein the folding assembly receives the mailer blank in a first position;

wherein the carriage system moves the folding system with respect to the transport assembly to a second position at a carriage speed that is the same as the transport speed while the folding system folds the mailer blank into a mailer at a folding speed that is less than the transport speed or while the mailer blank is static within the folding system; and wherein the carriage system returns the folding system to the first position to receive another mailer blank.

* * * * *